US009142093B2

(12) United States Patent
Jaffe et al.

(10) Patent No.: US 9,142,093 B2
(45) Date of Patent: Sep. 22, 2015

(54) GAMING SYSTEM HAVING RE-AWARDING OF STORED AWARDS

(71) Applicant: WMS Gaming Inc., Waukegan, IL (US)

(72) Inventors: Joel R. Jaffe, Glenview, IL (US); Andrew Fowler, Chicago, IL (US); Jeremie D. Moll, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 392 days.

(21) Appl. No.: 13/788,369

(22) Filed: Mar. 7, 2013

(65) Prior Publication Data

US 2013/0184056 A1 Jul. 18, 2013

Related U.S. Application Data

(63) Continuation of application No. 12/921,335, filed as application No. PCT/US2009/036535 on Mar. 9, 2009, now Pat. No. 8,454,429.

(60) Provisional application No. 61/068,742, filed on Mar. 10, 2008, provisional application No. 61/194,758, filed on Sep. 30, 2008.

(51) Int. Cl.
*G06F 17/00* (2006.01)
*G07F 17/32* (2006.01)

(52) U.S. Cl.
CPC .................................. *G07F 17/3258* (2013.01)

(58) Field of Classification Search
None
See application file for complete search history.

(56) References Cited

U.S. PATENT DOCUMENTS

| | | | |
|---|---|---|---|
| 5,570,885 | A | 11/1996 | Ornstein |
| 5,580,309 | A | 12/1996 | Piechowiak et al. |
| 5,632,485 | A | 5/1997 | Woodland et al. |
| 5,718,431 | A | 2/1998 | Ornstein |
| 5,720,662 | A | 2/1998 | Holmes, Jr. et al. |
| 5,722,891 | A | 3/1998 | Inoue |
| 5,732,950 | A | 3/1998 | Moody |
| 5,775,692 | A | 7/1998 | Watts et al. |
| 5,816,916 | A | 10/1998 | Moody |
| 5,823,873 | A | 10/1998 | Moody |
| 5,833,538 | A | 11/1998 | Weiss |

(Continued)

FOREIGN PATENT DOCUMENTS

| | | | |
|---|---|---|---|
| WO | 97/19736 | A1 | 6/1997 |
| WO | 2009/005657 | A1 | 1/2009 |
| WO | 2009/114472 | A1 | 9/2009 |

OTHER PUBLICATIONS

Search Report corresponding to International Patent Application Serial No. PCT/US2009/036535, United States Patent Office; dated Apr. 17, 2009, 2 pages.

(Continued)

*Primary Examiner* — Paul A D'Agostino
(74) *Attorney, Agent, or Firm* — Nixon Peabody LLP

(57) ABSTRACT

A gaming system for conducting a wagering game includes a wager input device for receiving a wager to play a wagering game, at least one display for displaying the wagering game, and at least one controller. The controller is operative to display a first outcome of the wagering game and award a first award associated with the first outcome, store the first award in a stored awards group, cause the at least one display to display the stored awards group, and re-award one or more awards in the stored awards group upon the occurrence of a triggering event.

27 Claims, 24 Drawing Sheets

(56) References Cited

U.S. PATENT DOCUMENTS

| | | | | |
|---|---|---|---|---|
| 5,848,932 | A | 12/1998 | Adams | |
| 5,996,997 | A | 12/1999 | Kamille | |
| 6,062,980 | A | 5/2000 | Luciano | |
| 6,126,542 | A | 10/2000 | Fier | |
| 6,159,098 | A | 12/2000 | Slomiany et al. | |
| 6,203,429 | B1 | 3/2001 | Demar et al. | |
| 6,312,334 | B1 | 11/2001 | Yoseloff | |
| 6,569,013 | B1 | 5/2003 | Taylor | |
| 6,612,927 | B1 | 9/2003 | Slomiany et al. | |
| 6,776,711 | B1 * | 8/2004 | Baerlocher | 463/16 |
| 7,252,589 | B1 | 8/2007 | Marks et al. | |
| 7,322,887 | B2 | 1/2008 | Belger et al. | |
| 7,618,319 | B2 | 11/2009 | Casey et al. | |
| 7,874,915 | B2 * | 1/2011 | Caspers et al. | 463/27 |
| 7,993,195 | B2 | 8/2011 | Belger et al. | |
| 8,162,740 | B2 * | 4/2012 | Aoki | 463/20 |
| 2002/0039918 | A1 | 4/2002 | Anderson et al. | |
| 2002/0151349 | A1 | 10/2002 | Joshi | |
| 2003/0104856 | A1 | 6/2003 | Wolf | |
| 2004/0053662 | A1 * | 3/2004 | Pacey | 463/16 |
| 2004/0106446 | A1 | 6/2004 | Cannon et al. | |
| 2004/0121838 | A1 * | 6/2004 | Hughs-Baird et al. | 463/25 |
| 2005/0054416 | A1 | 3/2005 | Hostetler et al. | |
| 2005/0055113 | A1 | 3/2005 | Gauselmann | |
| 2005/0153769 | A1 | 7/2005 | Casey et al. | |
| 2005/0187005 | A1 | 8/2005 | Rose | |
| 2006/0073874 | A1 | 4/2006 | Cregan et al. | |
| 2006/0084486 | A1 | 4/2006 | Belger et al. | |
| 2007/0054728 | A1 | 3/2007 | Hood | |
| 2009/0111557 | A1 * | 4/2009 | Jankowski | 463/20 |
| 2009/0117990 | A1 | 5/2009 | Englman et al. | |
| 2009/0124338 | A1 * | 5/2009 | Watkins et al. | 463/20 |
| 2010/0016063 | A1 | 1/2010 | Jaffe et al. | |
| 2010/0016071 | A1 | 1/2010 | Jaffe et al. | |
| 2010/0056251 | A1 | 3/2010 | Jaffe et al. | |
| 2011/0045892 | A1 | 2/2011 | Vann et al. | |

OTHER PUBLICATIONS

Written Opinion corresponding to International Patent Application Serial No. PCT/US2009/036535, United States Patent Office; dated Apr. 17, 2009, 5 pages.

* cited by examiner

GAMING SYSTEM HAVING RE-AWARDING OF STORED AWARDS

CLAIM OF PRIORITY AND CROSS-REFERENCE TO RELATED APPLICATIONS

This application is a continuation of U.S. patent application Ser. No. 12/921,335, which was filed on Sep. 7, 2010, as a U.S. National Phase of International Application No. PCT/US2009/036535, which was filed on Mar. 9, 2009, and claims the benefit of and priority to U.S. Provisional Patent Application No. 61/068,742, which was filed on Mar. 10, 2008, and U.S. Provisional Patent Application Ser. No. 61/194,758, which was filed on Sep. 30, 2008, all of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates generally to gaming apparatuses, and more particularly to gaming systems having stored awards and re-awarding of stored awards, and methods for playing wagering games with stored awards and re-awarding of stored awards.

BACKGROUND

Gaming terminals, such as slot machines, video poker machines, and the like, have been a cornerstone of the gaming industry for several years. Generally, the popularity of such machines with players is dependent on the likelihood, or perceived likelihood, of winning money at the machine, as well as the intrinsic entertainment value of the machine relative to other available gaming options. Where the available gaming options include a number of competing machines, and the expectation of winning at each machine is roughly the same or believed to be the same, players are likely to be attracted to the most entertaining and exciting machines. Consequently, operators strive to employ the most entertaining and exciting machines, features, and enhancements available since such machines attract frequent play and, hence, increased profitability.

One method that may be employed to enhance the entertainment value of a game is the opportunity for a player to re-win an award that the player won in a previous play of a game. The present invention is directed to a gaming system that allows a player to re-win awards.

SUMMARY

According to one aspect of the present disclosure, a gaming system for conducting a wagering game includes a wager input device for receiving a wager to play a wagering game, at least one display for displaying the wagering game, and at least one controller. The controller is operatively configured to: generate a first outcome of the wagering game; cause the display to display the first outcome; award a first award associated with the first outcome; store the first award in a stored awards group, the stored awards group generally comprising at least one previously awarded award; cause the display to display the stored awards group comprising the first award; and, upon the occurrence of a triggering event, re-award one or more awards in the stored awards group.

The first award may be stored in a first position of the stored awards group.

The controller may be further configured to remove a preselected one of the stored awards from the stored awards group.

The stored awards group may comprise the first award along with a plurality of previous awards. The stored awards may be stored sequentially. For instance, a previous award in the first position of the stored awards group may be shifted to a second position of the stored awards group, and the first award is stored in the first position of the stored awards group. To this regard, a second previous award may then be removed from the stored awards group. In addition, the first previous award may thereafter be shifted to a third position of the stored awards group, the first award is shifted to the second position, and the re-award award is stored in the first position of the stored awards group.

The re-award may comprise all of the awards in the stored awards group.

The controller may be further configured to generate a second outcome of the wagering game by cascading the first outcome. In this instance, the triggering event which triggers awarding of the re-award award comprises the second outcome coinciding with at least one predetermined winning outcome.

According to another aspect of the disclosure, a method of conducting a wagering game on a gaming system comprises: receiving a wager to play the wagering game; generating a first outcome of the wagering game; displaying the first outcome of the wagering game on at least one display; awarding a first award associated with the first outcome; storing the first award in a stored awards group displayed on the at least one display; and awarding a second award upon the occurrence of a triggering event, the second award comprising at least the first award.

The method may further comprise calculating a total re-award. In this instance, the total re-award consists of the mathematical sum of all previously awarded awards in the stored awards group. The second award is the total re-award.

The stored awards group may be stored in sequential order, preferably chronologically. To this regard, at or after the first outcome is displayed, the stored awards group is shifted such that the first award is added to a first position of the stored awards group and a previously stored award is removed from the stored awards group. Likewise, at or after the triggering event, the second award is stored in the first position of the stored awards group, and the first award is shifted to a second position. In this latter instance, a second previously stored award is removed from the stored awards group.

The triggering event may comprise a symbol based trigger. The symbol based trigger preferably comprises at least one occurrence of a trigger symbol appearing in the first outcome.

The method may further comprise: generating a second outcome of the wagering game by cascading the first outcome; and displaying the second outcome on the display. In this example, the triggering event which triggers awarding of the second award comprises the second outcome coinciding with at least one predetermined winning outcome.

According to another aspect of the disclosure, a method of conducting a wagering game on a gaming system comprises, displaying the wagering game on at least one display, receiving a wager to play the wagering game, awarding a replay award upon the occurrence of a first triggering event, redeeming the replay award upon the occurrence of a second triggering event and in response thereto (i) redisplaying a prior outcome of the wagering game and (ii) re-awarding a prior award associated with the prior outcome.

According to yet another aspect of the disclosure, a method of conducting a wagering game on a gaming system comprises, receiving at least one wager, displaying a plurality of outcomes of the wagering game on at least one display, sequentially storing in a game history a plurality of awards associated with the plurality of outcomes, providing a player with one or more replay awards, and sequentially recalling and re-awarding the plurality of awards from the game history in response to each redemption of a replay award.

According to still another aspect of the disclosure, a method of conducting a wagering game on a gaming system comprises, a) receiving at least one wager to play the wagering game, b) displaying a first outcome of the wagering game on at least one display, the first outcome including at least one winning outcome, the at least one winning outcome being associated with a first award, c) storing the first award in a stored-awards group, d) displaying another outcome of the wagering game on the at least one display, and e) in response to the another outcome of the wagering game including at least one winning outcome, the at least one winning outcome being associated with another award value, enhancing all stored awards in the stored-awards group, storing the another award value in the stored-awards group, repeating at least step (d).

The method may further comprise, clearing any stored awards in the stored-awards group in response to the another outcome of the wagering game not achieving a winning outcome.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1A:
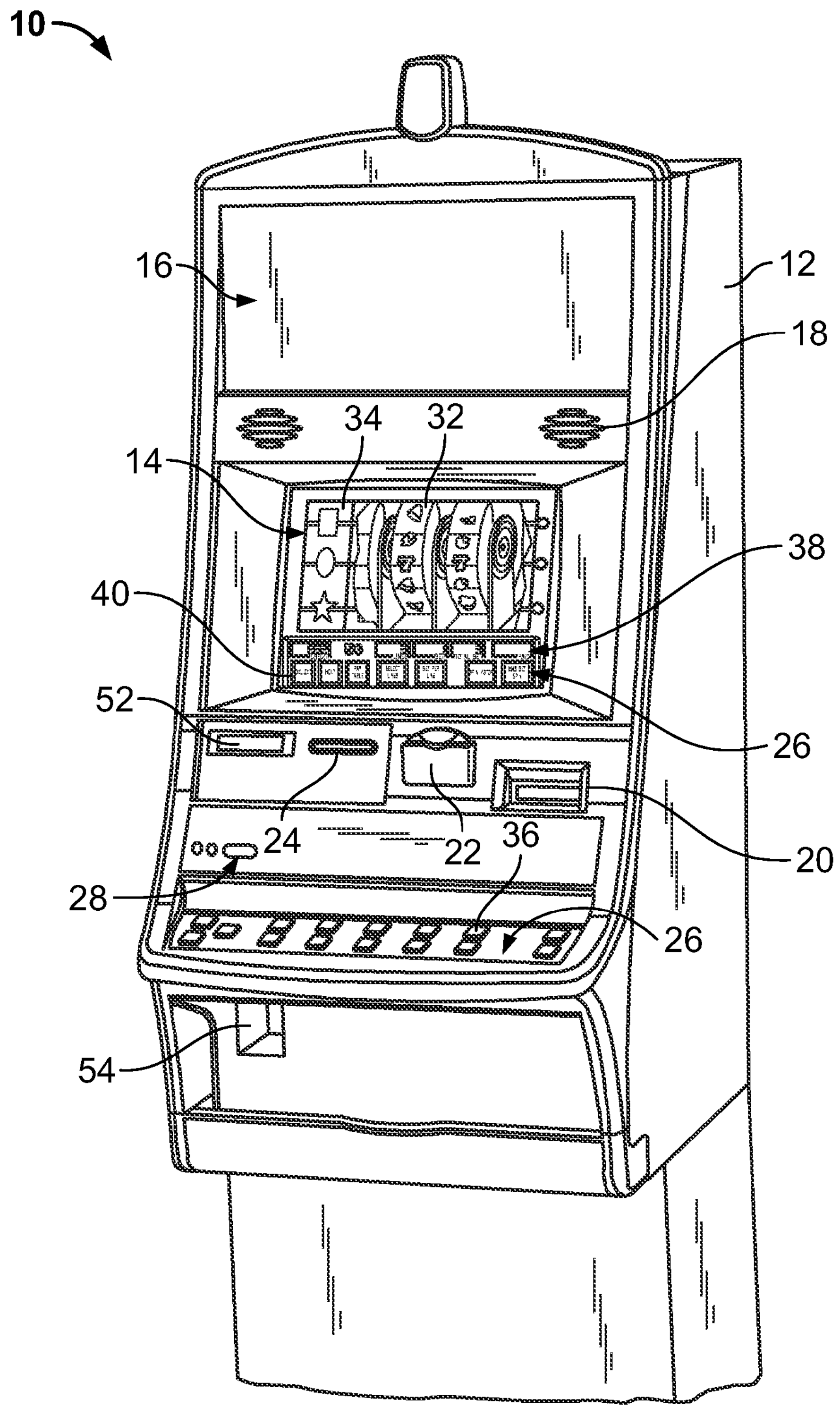
FIG. 1A is a perspective view of a free-standing gaming terminal according to an embodiment of the present invention.

While this invention is susceptible of embodiment in many different forms, there are shown in the drawings and will herein be described in detail embodiments of the invention with the understanding that the present disclosure is to be considered as an exemplification of the principles of the invention and is not intended to limit the broad aspect of the invention to the embodiments illustrated.

Figure 1B:
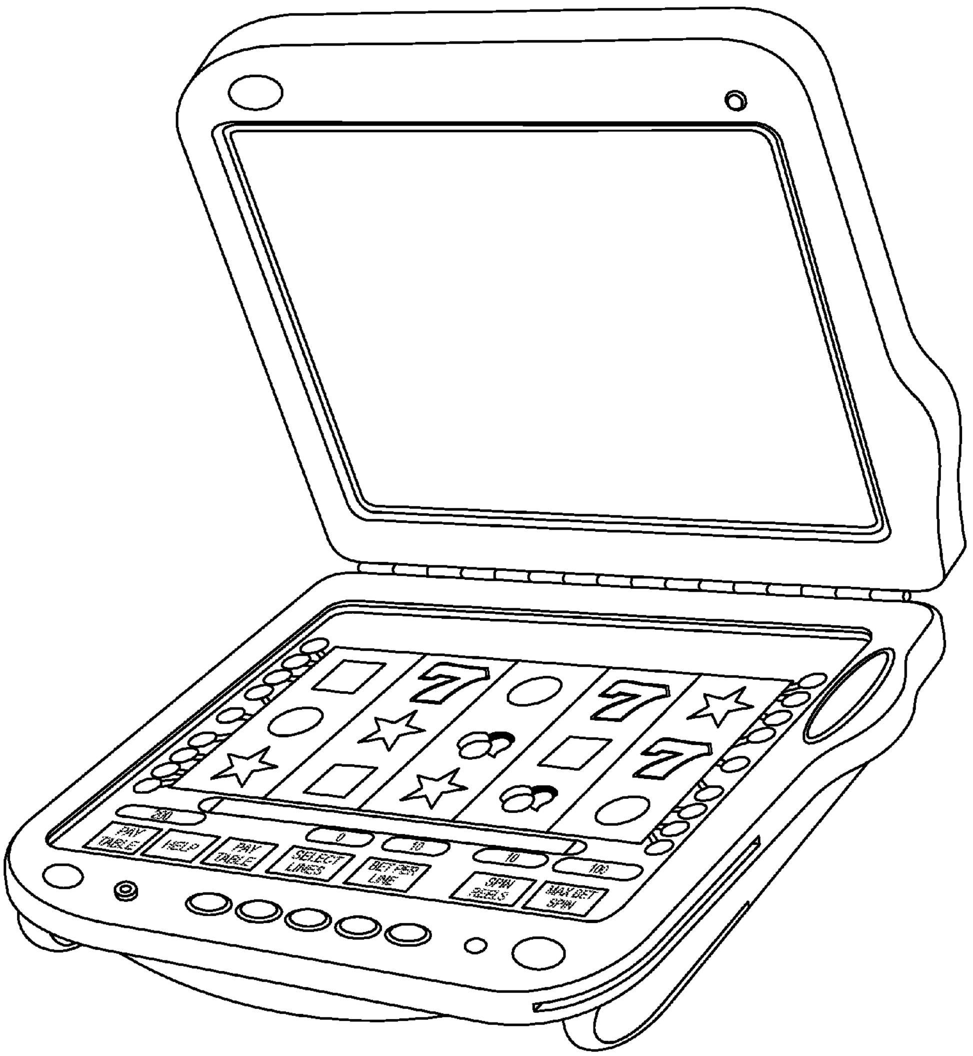
FIG. 1B is a perspective view of a handheld gaming terminal according to an embodiment of the present invention.

Referring to FIG. 1A, there is shown a gaming terminal 10 (also referred to herein as "gaming system"), which may be used, for example, in gaming establishments, such as casinos. With regard to the present disclosure, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play one or more video casino games, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1B, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area, indicated generally at 14, a secondary display area, shown generally as 16, and one or more audio speakers 18. The primary display area 14 and/or secondary display area 16 may display information. By way of example, such information may include information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While the aforementioned components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433, to Loose et al., entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10.

The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only, and not the mechanical reels 32, the mechanical reels 32 may be removed from the interior of the terminal and the video display 34 may be of a non-transmissive type. In contrast, if the wagering game conducted via the gaming terminal 10 relies upon the mechanical reels 32, but not the video display 34, the video display 34 may be replaced with a glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

The images provided by the primary and secondary displays 14, 16 may be rendered by various means in a variety of formats. By way of example, and not limitation, video images in the primary display area 14 and/or the secondary display area 16 may be rendered in two-dimensional (e.g., using Flash Macromedia™) or three-dimensional graphics (e.g., using Renderware™). Moreover, the images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc., without departing from the scope and spirit of the present invention.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354, entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328, to Holch et al., entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1B illustrates a portable or handheld device primarily used to display and/or conduct wagering games. The handheld device may incorporate the same features as the gaming terminal 10, or variations thereof. A more detailed description of a handheld device that may be utilized with the present invention can be found in PCT Patent Application No. PCT/US2007/000792, filed Jan. 26, 2007, and entitled "Handheld Device for Wagering Games," which is incorporated herein by reference in its entirety.

Figure 2:
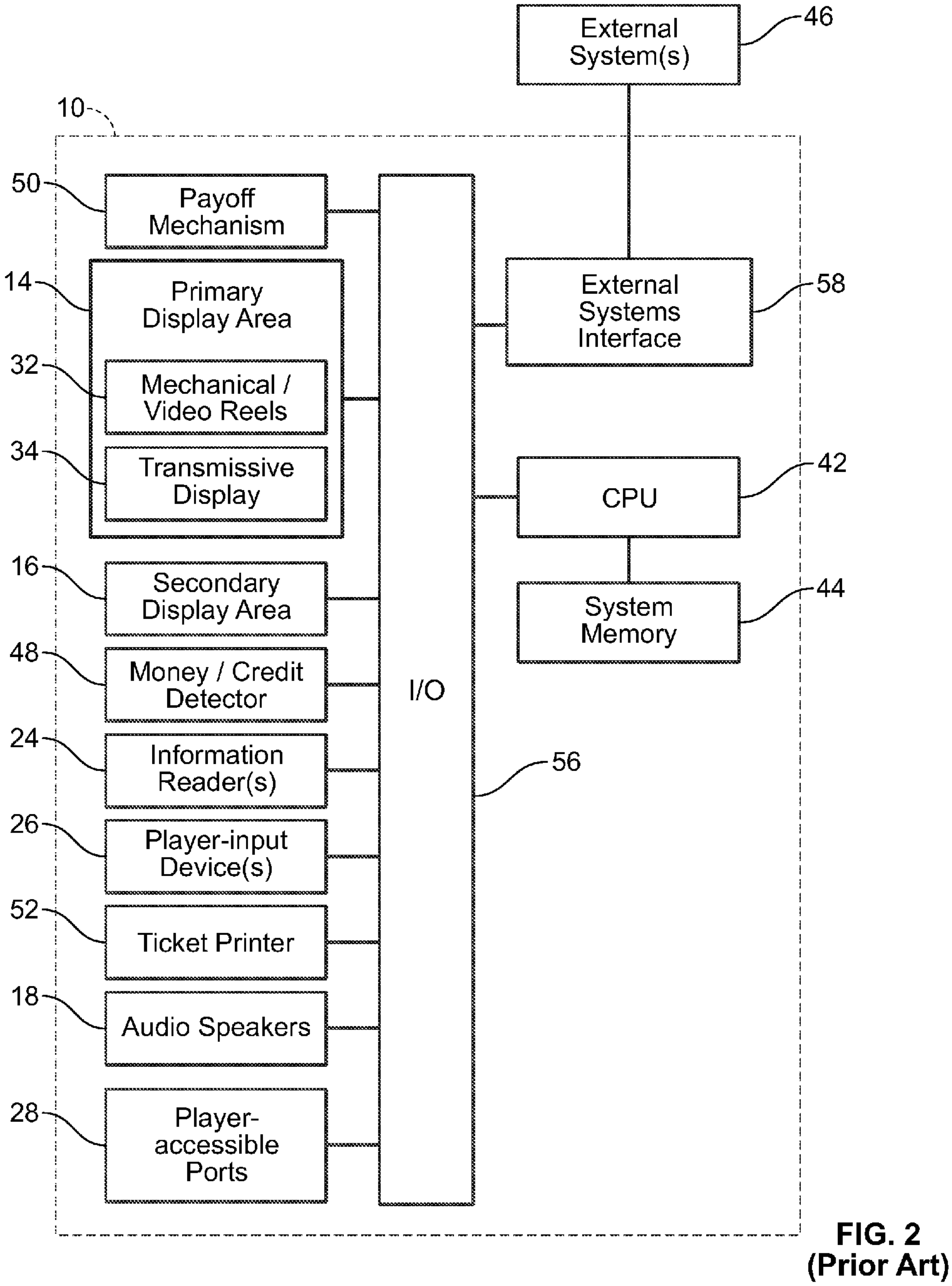
FIG. 2 (Prior Art)
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided, for example, in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include, for example, a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein. Recognizably, the gaming system 10 is not limited to the particular hardware schematically represented in FIG. 2, but may include, exclude, or substitute the various constituent components without departing from the scope of the appended claims.

The gaming terminal 10 may communicate with the external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
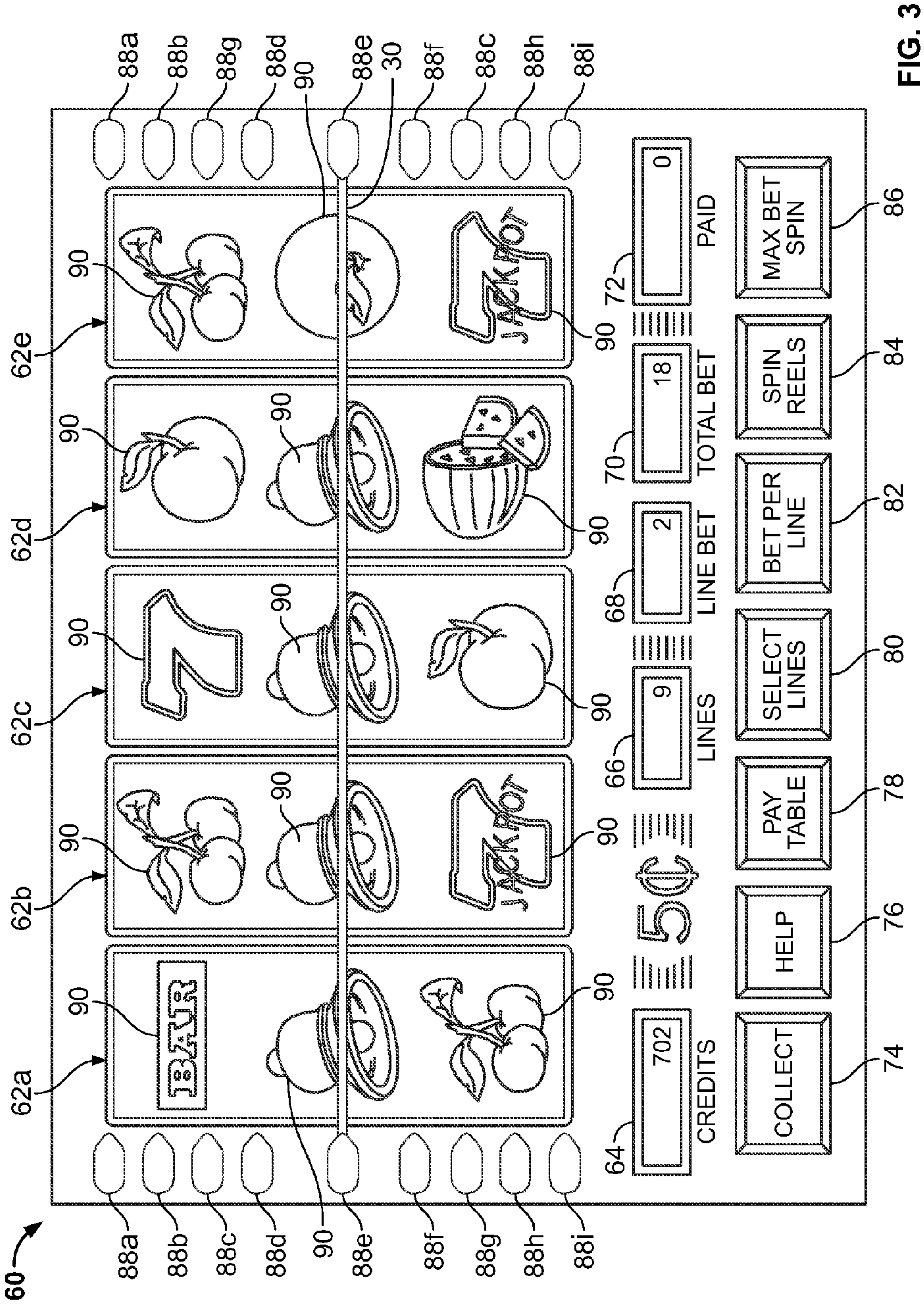
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated in accordance with one embodiment of the present disclosure. A player begins play of a basic wagering game by providing a wager, for example, via bill validator 20. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed, for example, on the primary display area 14 or a portion thereof. In FIG. 3, the basic-game screen 60 portrays a plurality of simulated movable reels, designated generally at 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, such as those presented in FIG. 3, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown, a gaming terminal with any plurality of reels may also be used in accordance with the present disclosure.

Figure 4:
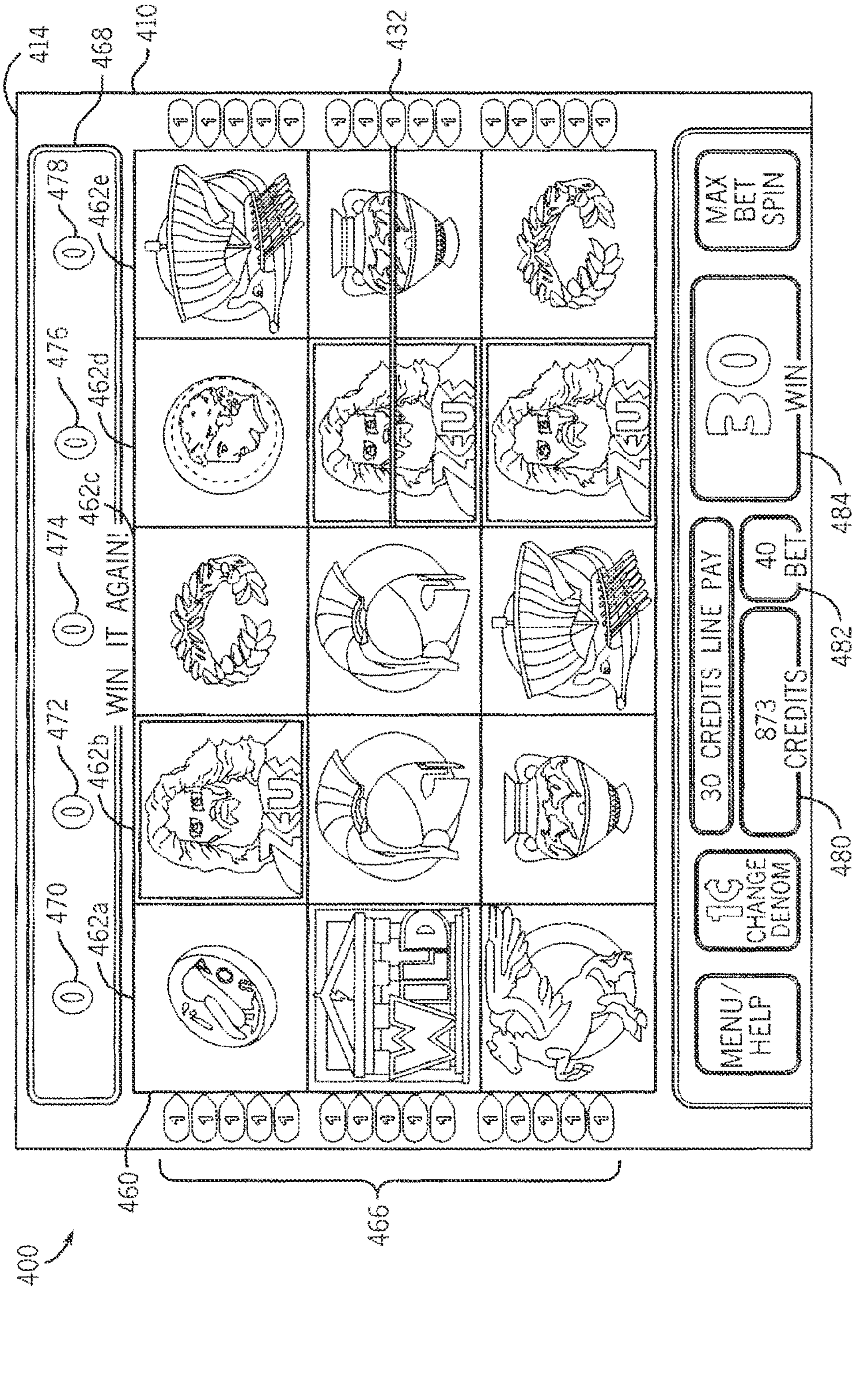
FIG. 4 is a screen shot of a display displaying a wagering game and a group of stored awards.

Referring now to FIG. 4, a screen shot of a display 414 of a gaming device 410 of a gaming system 400 is shown. The display 414 may be any form of display, such as those described with reference to the free standing and handheld devices of FIGS. 1A and 1B. The display 414 includes a display of a wagering game 460, which in this embodiment is a slot game as shown in FIG. 4. The wagering game 460 includes a plurality of symbol bearing reels 462*a*, 462*b*, 462*c*, 462*d*, and 462*e* which are spun and stopped to reveal combinations of symbols which are evaluated. Winning combinations of symbols landing on activated paylines (those paylines for which a wager has been received), cause awards to be paid in accordance with a paytable of the gaming system 400. The symbols on the reels 462*a,b,c,d,e* are arranged in an array or matrix 466, which in this embodiment is a 3×5 matrix 466 of symbols.

In one embodiment, a portion of the display 414 displays a stored awards group 468. In this embodiment there are five stored award fields 470, 472, 474, 476, 478. In an embodiment, all the stored award fields 470, 472, 474, 476, 478 together may be referred to as a stored awards group 468. In this embodiment, each stored award field 470, 472, 474, 476, 478 aligns vertically with a reel 462*a,b,c,d,e* on the display 414. Each stored award field 470, 472, 474, 476, 478 displays a value of a stored award arranged in a consecutive order (left to right) with the oldest stored award in the left most award field 470 and the most recent stored award in the right most award field 478. In this example, the initial value of each displayed stored award is zero ('0') as shown by a zero ('0') that appears in each stored award field 470, 472, 474, 476, 478. In this example, each of the stored awards in the group 468 comprises a number of credits, which are displayed in each stored award field 470, 472, 474, 476, 478. The awards displayed in the stored awards group 468 may be awarded to the player in further game play, as described herein.

As used herein, the stored award field 478 that appears on the far right-hand side of the stored awards group 468 as shown in FIG. 4 may also be referred to as "first stored award field" or "first position". The stored award field 476 that appears next to and left of the first stored award field 478 may be referred to as "second stored award field" or "second position". The stored award field 474 that appears next to and left of the second stored award field 476 may be referred to as "third stored award field" or "third position". The stored award field 472 that appears next to and left of the third stored award field 474 may be referred to as "fourth stored award field" or "fourth position". The stored award field 470 that appears next to and left of the fourth stored award field 472 may be referred to as "fifth stored award field", "last stored award field", or "fifth position". In alternative embodiments, the stored award fields 472 may be "ordered" in a variety of different sequences, patterns, and other arrangements through which the awards are shifted or traversed as described herein.

In the embodiment shown in FIG. 4, a CREDITS meter 480 displays the number of credits the player has available for play of the wagering game 460. A BET meter 482 displays the number of credits the player wagered in a particular play of the wagering game 460. A WIN meter 484 displays the number of credits a player was awarded for winning combinations occurring on a particular play of the wagering game 460. Credits won and appearing in the WIN meter 484 are then transferred to the CREDITS meter 480, increasing the balance thereof. In this example, the CREDIT meter 480 displays eight hundred and seventy three ('873') credits available for play, the BET meter 482 displays a forty ('40') credit bet, and the WIN meter 484 displays a thirty ('30') credit award.

Figure 5:
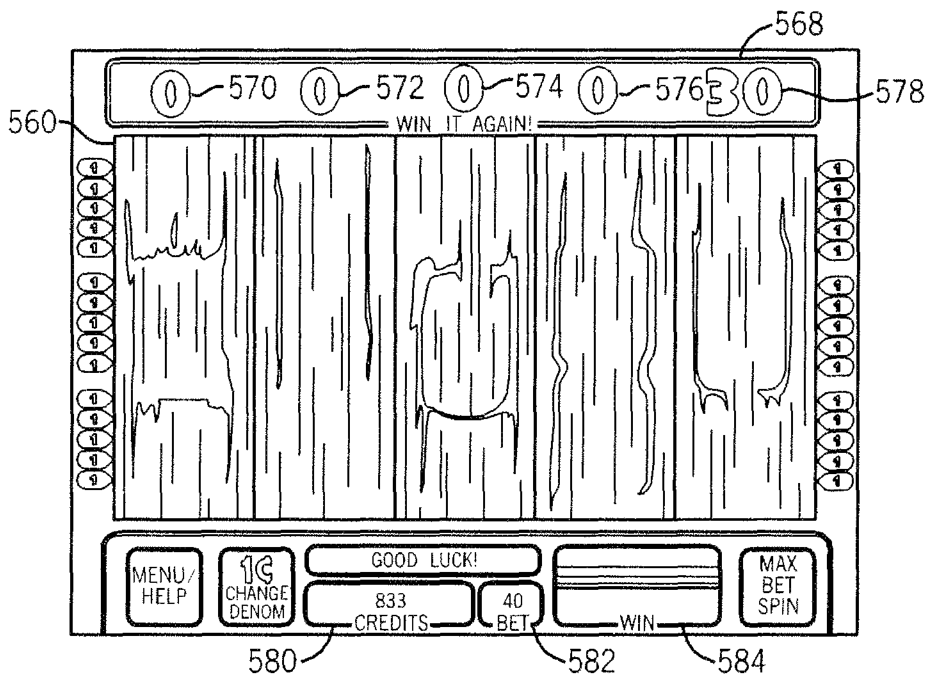
FIG. 5 is a screen shot of a display displaying the wagering game and stored awards while a set of reels of the wagering game are spinning.

Turning to FIG. 5 that depicts the wagering game 560 after a player initiates a game play, for example, by pushing a spin button. The forty ('40') credit bet depicted in the BET meter 582 is deducted from the available credits leaving a balance of eight hundred and thirty three ('833') remaining credits as displayed in the CREDITS meter 580 of FIG. 5. The forty ('40') credit wager that is in play remains displayed in the BET meter 582. The thirty ('30') credits depicted in the WIN meter 484 of FIG. 4 has been stored in the first stored award field 578 of the stored awards group 568. The reels continue to spin until they are stopped to reveal an outcome of the wagering game 560, as seen in FIG. 6.

In the illustrated embodiment, previously awarded awards enter the group 568 and are stored in a sequential order (e.g., chronologically). Storing awards in a sequential order comprises shifting the stored awards group 568 right to left, and storing the award displayed in the WIN meter 484 of FIG. 4 into the first position of the stored award field 578. Additionally, each award in the stored awards group 568 is shifted over one stored award field 570, 572, 574, 576, 578 to the left. Thus, the stored award displayed in the first stored award field 578 is shifted into the second stored award field 576; the stored award displayed in the second stored award field 576 is shifted into the third stored award field 574; the stored award displayed in the third stored award field 574 is shifted into the fourth stored award field 572; the stored award displayed in the fourth stored award field 572 is moved into the fifth stored award field 570; and, finally, the stored award in the fifth stored award field 570 is removed from the stored awards group 568, thereby making it no longer available to be re-awarded.

Figure 6:
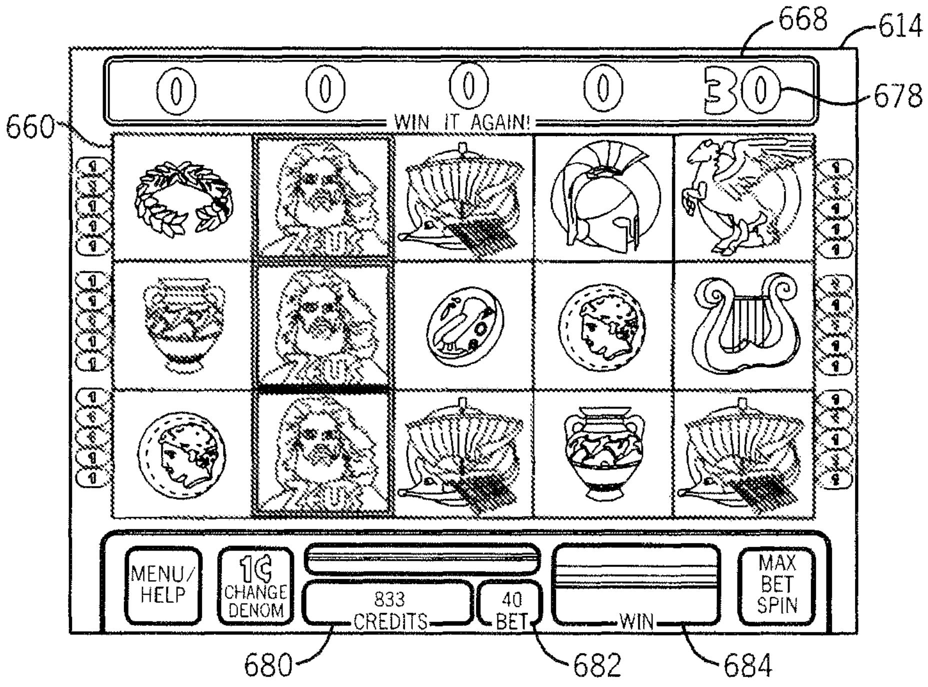
FIG. 6 is a screen shot of a display displaying the wagering game and stored awards after an outcome having no winning combinations of symbols (an award of zero ('0') credits).

Turning to FIG. 6, a screen shot of a display 614 displays the wagering game 660 after completion of the game play illustrated in FIG. 5. In this example, the completed game play results in no winning combinations of symbols appearing in the wagering game 660. Thus, no award is provided (i.e., a zero ('0') credit award). In response thereto, the WIN meter 684 reflects zero to indicate that no credits have been awarded. The zero credit award in the WIN meter 684 has not yet been transferred and stored in the stored awards group 668. Thus the stored awards group 668 depicted in FIG. 6 is in the same state as the stored awards group 568 of FIG. 5. Further, the BET and CREDITS meters 682, 680 remain unchanged.

Figure 7:
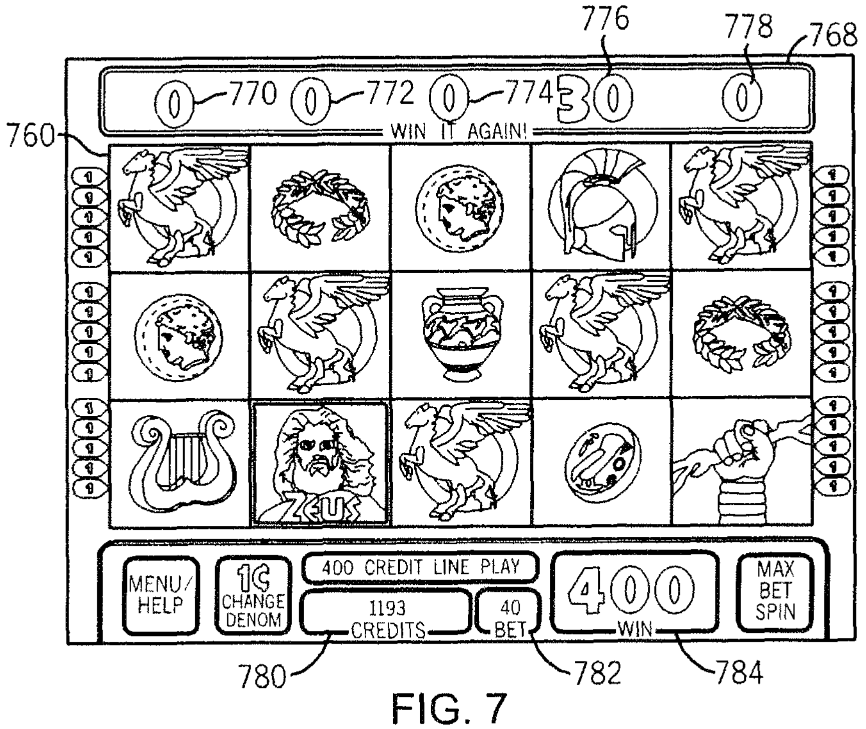
FIG. 7 is a screen shot of a display displaying the wagering game and stored awards after an outcome having a winning combination of symbols and an accompanying four hundred ('400') credit award.

Turning to FIG. 7, the stored awards group 768 has been updated to include the zero ('0') credit award from the previous play of the game shown in FIG. 6. Thus, the zero is stored in the first award position 778, and the other awards have been transferred one position to the left in the group 768. FIG. 7 further depicts a subsequent play of the wagering game 760 resulting in a four hundred ('400') credit award. The four hundred ('400') credit award is shown in the WIN meter 784 of FIG. 7. The BET meter 782 displays a forty credit ('40') bet that was placed to win the four hundred ('400') credit award. After deducting the forty ('40') credit bet and adding the four hundred ('400') credit award to the credits displayed in the CREDITS meter 780, the balance is now one thousand one hundred and ninety three ('1193') credits as shown in the CREDITS meter 780.

Figure 8:
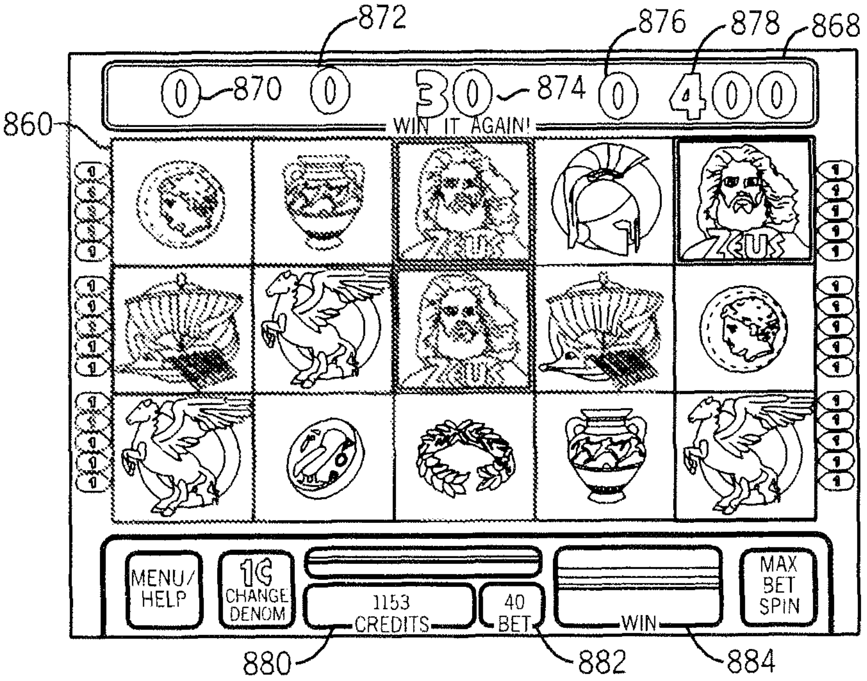
FIG. 8 is a screen shot of a display displaying the wagering game and stored awards after storing the four hundred ('400') credit award.

Referring now to FIG. 8, yet another play of the wagering game 860 is displayed. On this play, the outcome once again yields no winning combinations of symbols, and thus the result is another zero ('0') credit award, which is reflected in FIG. 8 by an empty WIN meter 884. Also seen in FIG. 8 is the updated stored awards group 868, which now reflects the addition of the four hundred ('400') credit award of FIG. 7 to the first stored awards field 878 of the stored awards group 868. Moreover, the other stored awards have been shifted to the left by one award position 870, 872, 874, 876 such that the thirty ('30') credit award is now in the third award position 874. The BET meter 882 displays the forty credit ('40') bet that resulted in the zero ('0') credit award. After deducting the forty ('40') credit bet, one thousand one hundred and fifty three ('1153') credits remain in the CREDITS meter 880.

Figure 9:
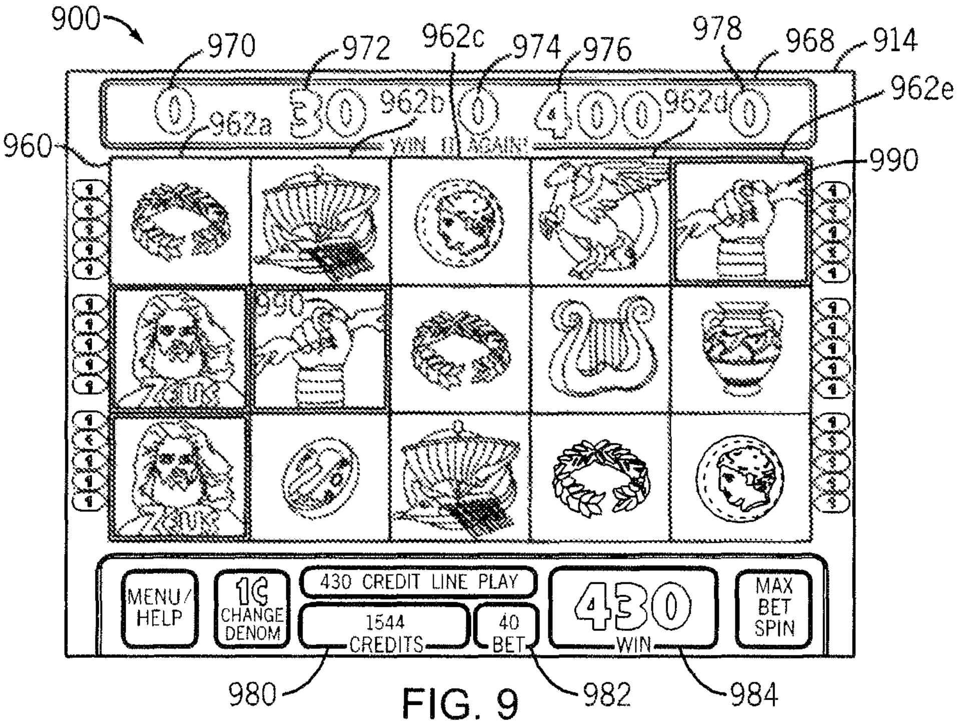
FIG. 9 is a screen shot of a display displaying a triggering event of the wagering game in response to which a group of stored awards is awarded.

Referring now to FIG. 9, shown is a screen shot of a display illustrating a triggering event causing a re-award of one or more of the awards in the stored awards group 968. The embodiment of FIG. 9 depicts a gaming system 900 where a symbol driven triggering event causes a re-award of stored awards. The symbol driven triggering event in this embodiment comprises a particular outcome or arrangement of symbols in the wagering game 960. For example, as seen in FIG. 9, two or more "Lightning" symbols 990 appearing simultaneously in an outcome of the wagering game 960 triggers the re-awarding of the stored awards comprising the stored awards group 968, as described herein. In yet other embodiments, the triggering event may include time-based triggers where the stored awards group 968 is awarded after a certain amount of time has elapsed. Moreover, the trigger may be a randomly selected event, such that the stored awards group 968 is randomly awarded. In yet other embodiments, triggering events may include a threshold time playing a wagering game 960 (time on device), total wagers input meeting a predetermined amount (coin in), accumulation of a certain amount of credits, points, or assets, satisfaction of a predetermined number of sequential winning outcomes, etc.

In response to the occurrence of the triggering event, one or more of the awards in the stored awards group 968 is provided to the player again—i.e., "re-awarded". In one embodiment, all the stored awards comprising the stored awards group 968 are provided in the re-award, and are thus summed to determine the re-award amount. As seen in FIG. 9, the five awards in the stored awards group 968 comprise awards of 0, 30, 0, 400, and 0 respectively oriented in the five positions 970, 972, 974, 976, 978 of the group 968, and totaling 430 credits. Thus, the re-award, which in this example is four hundred thirty ('430') credits, is provided to the player, as shown in the WIN meter 984 of FIG. 9. Applying the four hundred thirty ('430') credit re-award and deducting the forty ('40') credit wager, the balance in the CREDITS meter 980 is now one thousand five hundred forty four ('1544') credits.

Figure 10:
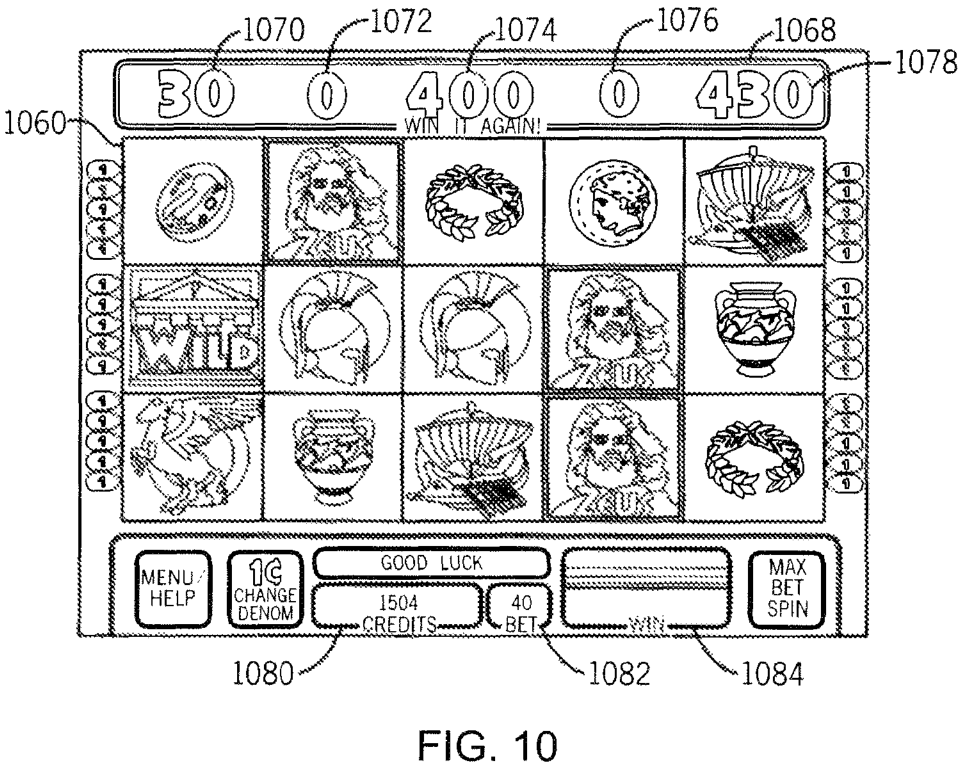
FIG. 10 is a screen shot of a display displaying the wagering game after storing yet another award.

Turning to FIG. 10, the stored awards group 1068 has been updated to include the re-award from FIG. 9. Specifically, in an embodiment, the re-award amount is also stored in the stored awards group 1068, specifically in the first position 1078. Thus, the re-award amount may be won again if a subsequent triggering event occurs while the re-award amount (430 credits) remains in the stored awards group 1068. Thus, for example, if the triggering event were to occur again during the play depicted in FIG. 10, the new re-award amount would be 860 credits, namely the mathematical sum of the five awards in the updated stored awards group 1068. The remaining awards have once again been shifted one position 1070, 1072, 1074, 1076 to the left to accommodate the addition of the re-award amount.

Figure 11:
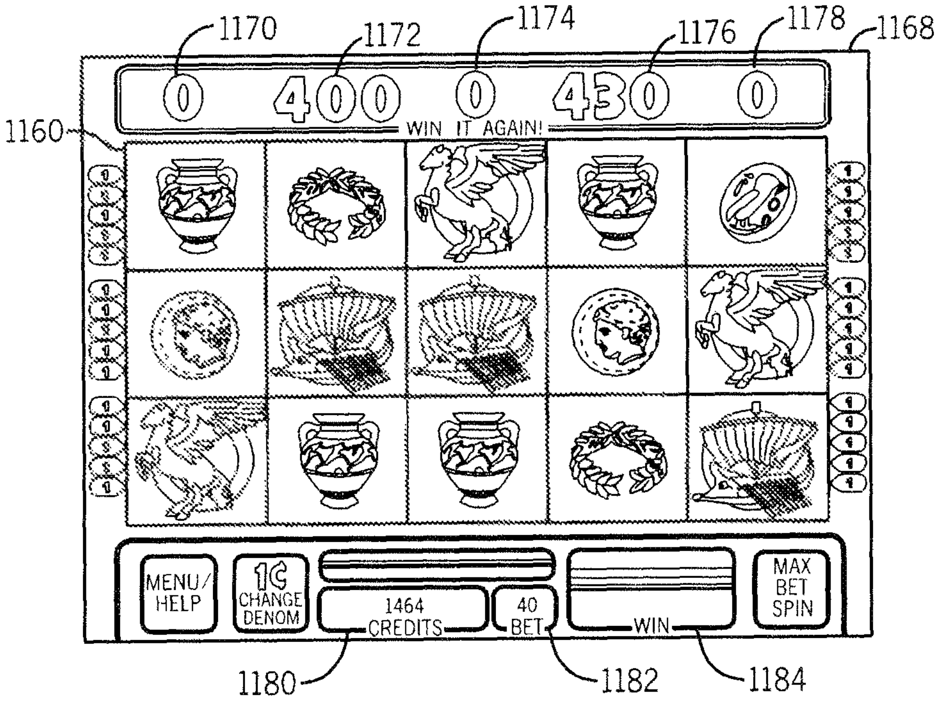
FIG. 11 is a screen shot of a display displaying a state of the wagering game after a previously stored award is removed from a group of stored awards.

Thus, by cycling the stored awards in the stored awards group 1068, each stored award has a limited availability to be won in the form of a re-award. In the embodiment shown, each award is stored for five plays of the wagering game 1060. The shifting mechanism causes each award to start in the first position 1078, and move to the left on consecutive plays of the wagering game 1060, until the award disappears from the group 1068 after the fifth play of the game 1060. In this way, each award has a limited availability, life-expectancy, or shelf life during which it may be won (by being included in the re-award). For example, turning to FIG. 11, the thirty ('30') credit award in the fifth position 1070 in FIG. 10, has now been removed from the stored awards group 1168. Each of the remaining awards has been shifted to the left, one position closer to the end of their availability, while the first position has been occupied by the most recent win amount (in this case a zero '0' credit win from FIG. 10).

The Win-It-Again feature described herein with relation to FIGS. 4-11 may also be applied to wagering games other than slot games. For example, in an embodiment, the primary wagering game may be a poker game in which a player is dealt cards, and optionally may select cards to discard and be replaced in an effort to create winning hand combinations. In such a poker game, certain resultant hands or outcomes may be paid awards in accordance with one or more pay tables of the gaming system. As with the slot game embodiment, received awards may be stored in the stored awards group, such that the player may track the history of outcomes of prior plays of the game. In some embodiments, a representation of the winning outcome or resultant hand may be visually stored and displayed in the stored awards group, along with the credit amount won. For example, a graphic of the word "Straight" or of the five card outcome comprising a "straight" may be placed in the stored awards group, along with the award associated and provided therewith (i.e. 500 credits).

Also, as with the slot embodiment, upon the occurrence of a triggering event, one or more stored awards in the stored awards group may be re-awarded to the player. For example, in one embodiment, if a player achieves a winning outcome or resultant hand that is at least as good as, or better than a designated ranked hand, the player triggers the re-award of the stored awards group. In one embodiment, if a player achieves an outcome which is a straight or better (a straight, a flush, a full house, four of a kind, straight flush or royal flush), he triggers the re-award of the stored awards group. In other embodiments, the occurrence of a special symbol or card in an outcome may comprise the triggering event. For example, being dealt a wild card, or joker, in an embodiment, may trigger the re-awarding mechanism of the Win-It-Again feature. In yet other embodiments, the triggering event may comprise a certain order, arrangement or configuration of cards. As with the slot embodiment, a variety of triggering events may be utilized. In some embodiments, as with the slot game, the re-award amount itself may be stored in the stored awards group as having been the most recent award. In this way, the re-award amount comprises the most recent award, which may be re-awarded yet again if another triggering event occurs while the re-award remains in the stored awards group.

An alternative embodiment of a gaming system 1200 is displayed in FIGS. 12-16, in which stored awards may be displayed as prior outcomes on the display and the prior outcomes may be re-awarded in response to a triggering event. A prior outcome, in an embodiment, may be an award that was previously awarded, and the prior outcome may also comprise a display of the state of the wagering game 1260 associated with the prior outcome. In one embodiment prior outcomes may be displayed and stored in sequential order so as to form an Award History tracker—that is, displayed in the order the prior outcomes were awarded.

Figure 12:
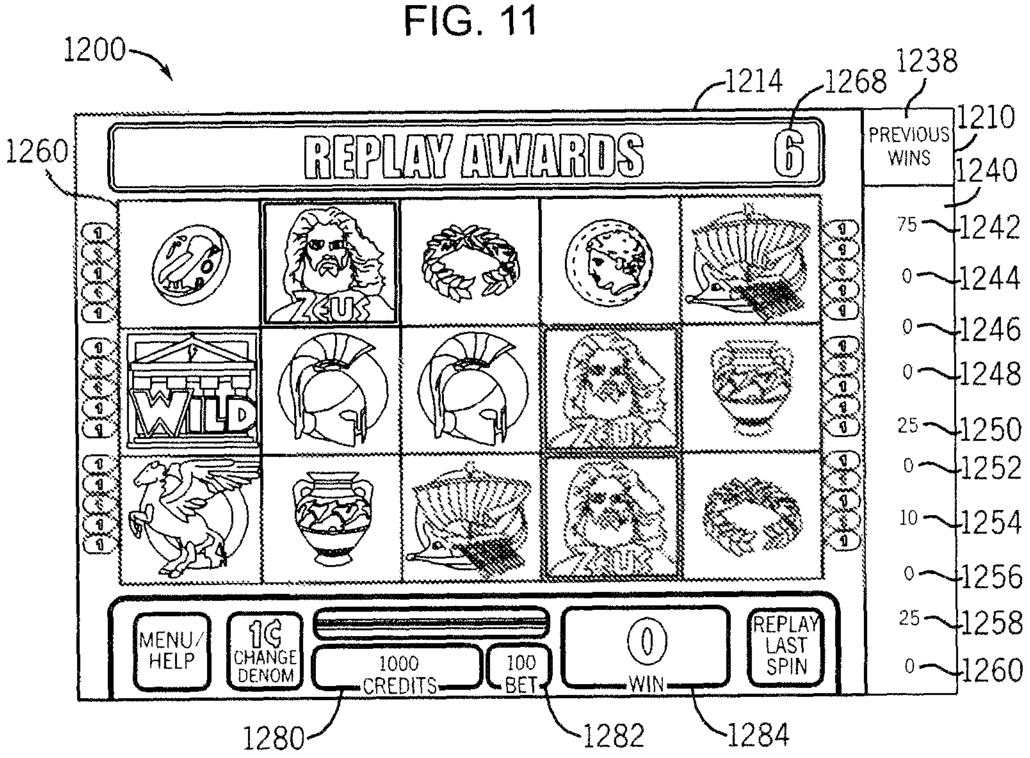
FIG. 12 is a screen shot of a display displaying an alternative embodiment of a wagering game which includes replay awards and a group of prior outcomes.

Referring to FIG. 12, shown is a display 1214 of a gaming device 1210 of a gaming system 1200 that provides re-awards of stored prior outcomes and re-displays the associated outcomes. In an embodiment, the display 1214 comprises a field that displays a REPLAY AWARDS meter 1268, which contains a number of replay awards available for redemption. The example REPLAY AWARDS meter 1268 displays six ('6') replay awards available for redemption. In this embodiment, the display 1214 also comprises a prior outcomes field 1240 that displays at least one prior outcome 1242. However, in the embodiment depicted in FIG. 12 there are ten ('10') displayed prior outcomes 1242, 1244, 1246, 1248, 1250, 1252, 1254, 1256, 1258, 1260, which show a chronological history of awards from the ten most recent plays of the wagering game 1260, with the most recent award 1242 at the top of the prior outcomes field 1240 and the oldest award 1260 at the bottom of the prior outcomes field 1240. In an embodiment, the prior outcomes field may contain a heading or label 1238, as seen in FIG. 12 labeled "PREVIOUS WINS". In this embodiment the display 1214 also comprises a CREDITS meter 1280 that displays the number credits available for game play. A BET meter 1282 displays the wager amount for a current game play. And a WIN meter 1284 displays an amount awarded for a current game play.

Figure 13:
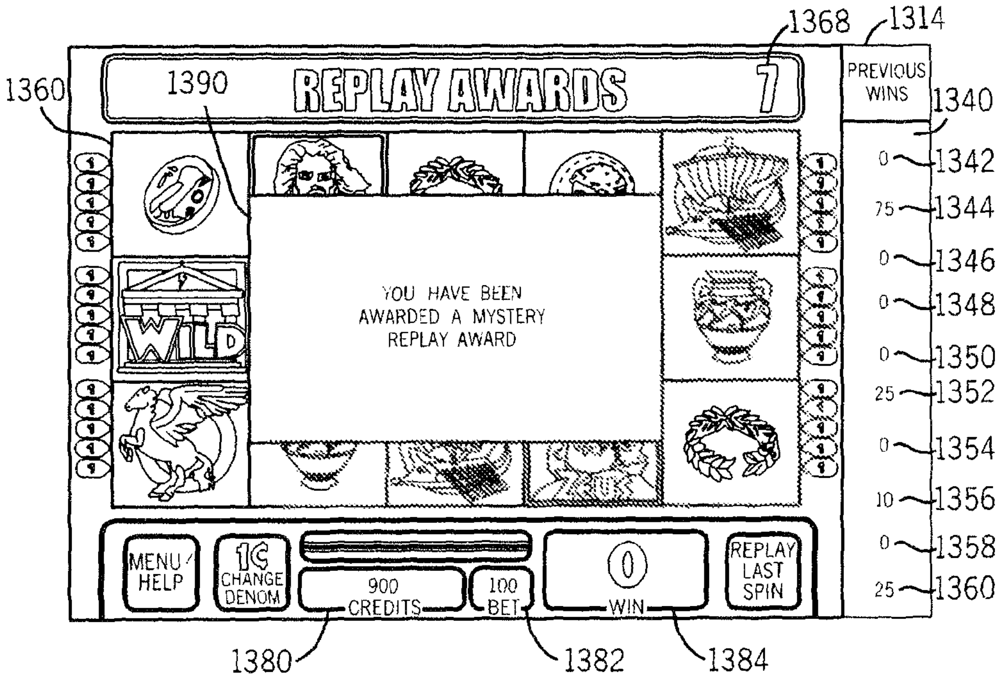
FIG. 13 is a screen shot of a display depicting the award of a mystery replay award.

Turning now to FIG. 13, depicted is a triggering event which causes an award of a replay award. In an embodiment, replay awards may be triggered in a "mystery" fashion. A mystery trigger is a trigger where the player is unaware of what caused an award. The player simply is informed that he has been awarded a replay award. For example, mystery triggering events may include time-based triggers where a replay award is awarded after a certain amount of time has elapsed. Moreover, the mystery trigger may be a randomly selected event, such that a replay award is randomly awarded. In yet other embodiments, mystery triggering events may include a threshold time playing a wagering game 1260 (time on device), total wagers input meeting a predetermined amount (coin in), accumulation of a certain amount of credits, points, or assets, etc. In an alternate embodiment, the triggering event may be a symbol driven triggering event. A symbol driven triggering event, or symbol triggered replay award may be associated with, for example, three or more symbols aligning on an active payline.

Returning to FIG. 13, overlying the wagering game 1360 is a pop-up window 1390 that communicates to the player that a replay award was awarded in response to the occurrence of a mystery triggering event. The award of the replay award results in the REPLAY AWARDS meter 1368 being incremented to seven ('7'). Thus, the player is now informed as to the updated balance of remaining replay awards available for redemption (as described later herein). FIG. 13 also depicts storing of an outcome and associated award of a play of the wagering game 1360. The outcome of the wagering game 1360 displayed in FIG. 13 (same as in FIG. 12) results in no winning combinations, and thus a zero ('0') credit award shown in the WIN meter 1384. Because the zero ('0') credit award is the most recently awarded, the zero ('0') credit award is stored in the first position 1342 of the prior outcomes field 1340.

Additionally, each displayed prior outcome 1342-1360 is shifted down to a subsequently lower position and the prior outcome displayed in the last prior outcome position 1360 is removed from the prior outcomes field 1340. Thus, the zero ('0') credit prior outcome depicted in the last position 1260 of the prior outcomes field 1240 of FIG. 12 is removed from the prior outcomes field 1340 depicted in FIG. 13. The twenty five ('25') credit prior outcome is shifted from the ninth prior outcome position 1258 as depicted in FIG. 12 to the last prior outcome position 1360 as depicted in FIG. 13. The shifting of prior outcomes continues for each prior outcomes position such that the seventy five ('75') credit award displayed in the first prior outcome position 1242 of FIG. 12 is shifted into the second prior outcome position 1344 of FIG. 13. The zero ('0') credit award depicted in the WIN meter 1384 of FIG. 13 is copied to and stored in the first prior outcome position 1342 of the prior outcomes field 1340 as shown in FIG. 13. The arrangement of symbols in the outcome displayed in FIG. 13 is also stored in memory of the gaming system (but not necessarily displayed). Thus, the outcome is stored and available for re-display at an appropriate time.

Figure 14:
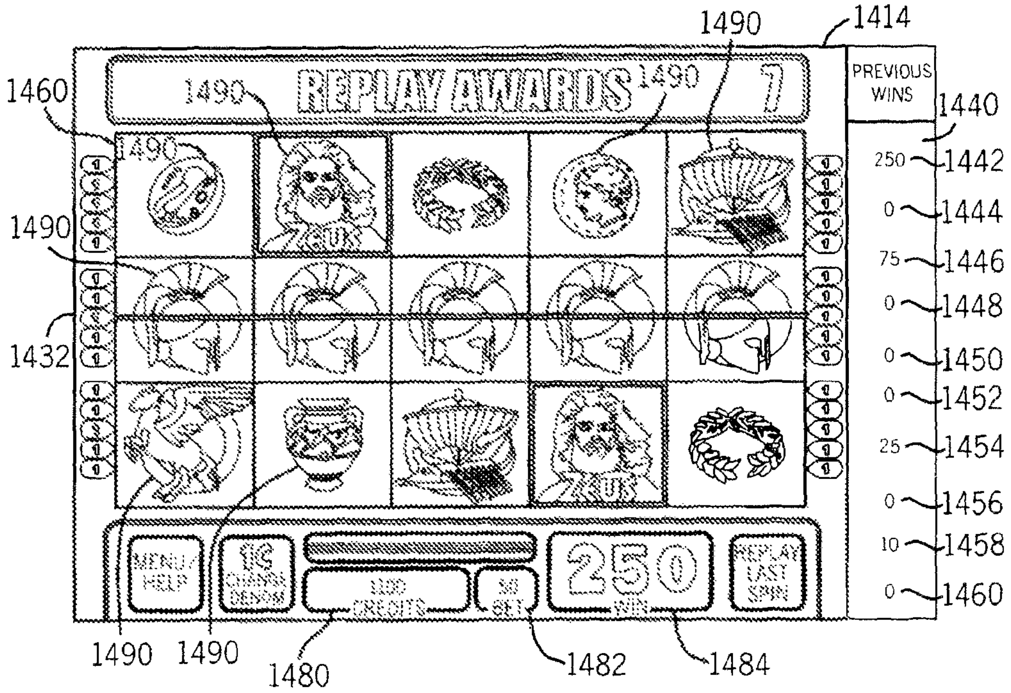
FIG. 14 is a screen shot of a display depicting a storing of a winning outcome.

Referring now to FIG. 14, another play of the wagering game 1460 is depicted. In the example illustrated in FIG. 14, on this play of the wagering game 1460, the outcome comprises a winning combination of symbols, specifically five "Helmet" symbols 1490 aligning on an active payline 1432, which results in a two hundred fifty ('250') credit award. The two hundred fifty ('250') credit award is displayed in the WIN meter 1484 and subsequently added to the CREDITS meter 1480. The two hundred fifty credit ('250') credit award is also added to and displayed in the first prior outcome position 1442 of the prior outcomes field 1440. As before, each prior outcome is shifted to a subsequently lower position and the prior outcome displayed in the last prior outcome position 1460 is removed from the prior outcomes field 1440. Thus the twenty five ('25') credit award depicted in the last prior outcome position 1360 of FIG. 13 is removed from the prior outcomes field 1440 of FIG. 14. The remaining prior outcomes 1342-1358 of FIG. 13 are moved to a subsequently lower position 1444-1460 in FIG. 14.

Figure 15:
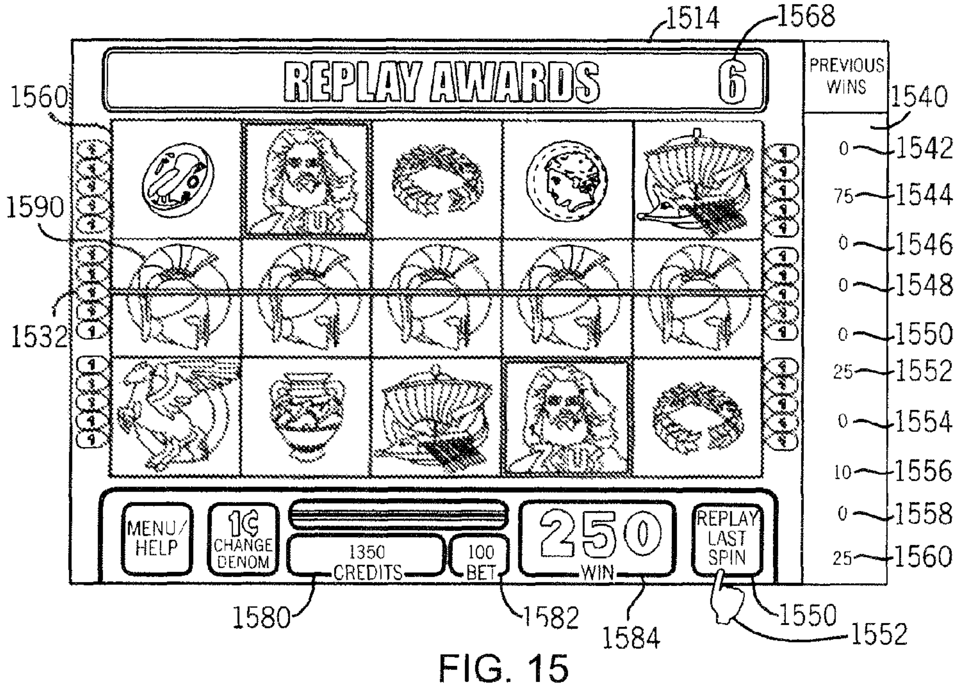
FIG. 15 is a screen shot of a display depicting a player redeeming a replay award.

Turning now to FIG. 15, a second triggering event is displayed which depicts the redemption of a replay award. In this embodiment, the triggering event causing awarding of the replay award comprises pressing a "REPLAY LAST SPIN" touch screen button 1550 shown on this display 1514. As seen in FIG. 15, this is depicted in FIG. 15 by a player's hand 1552 touching the REPLAY LAST SPIN touch screen button 1550. In response to a player touching the REPLAY LAST SPIN touch screen button 1550 the number of replay awards in the meter 1568 is decremented (from 7 to 6). Moreover, in response to the touching of the button 1550, the prior outcomes field 1540 is shifted upward (in reverse), a prior outcome of the wagering game 1560 is redisplayed and an award associated with a prior outcome is re-awarded. Thus, the REPLAY LAST SPIN button 1550 serves to allow the player to "rewind" the game play action by one or more outcomes (and associated awards) which have been stored.

In FIG. 15, decrementing the number of replay awards is illustrated by the number of replay awards being decremented from the seven ('7') shown in the REPLAY AWARDS meter 1468 of FIG. 14 to the six ('6') shown in the REPLAY AWARDS meter 1568 of FIG. 15. Moreover, redemption of the replay award has resulted in the prior outcomes field 1540 being shifted upwards to reflect the redemption. Thus, the 250 credit award displayed in the first prior outcome position 1442 in FIG. 14 is "re-awarded" and "re-displayed" in FIG. 15. The 250 credit award is copied into the WIN meter 1584 and the remaining prior outcomes 1444-1460 in FIG. 14 are shifted up one position 1542-1558 in FIG. 15. Thus, the prior outcome displayed in the second prior outcome position 1444 in FIG. 14 is moved to the first prior outcome position 1542 of FIG. 15. The prior outcome displayed in the third prior outcome position 1446 of FIG. 14 is moved to the second prior outcome position 1548 illustrated in FIG. 15, and so on. The 25 credit prior outcome which was removed from the bottom of the display 1440 in FIG. 14 is returned to the tenth prior outcome position 1560 in FIG. 15, as a result of the "rewinding" process.

In FIG. 15, redisplaying the prior outcome associated with the two hundred and fifty ('250') credit award of FIG. 14 entails redisplaying the arrangement of symbols of the wagering game 1460. Thus the symbols 1490 shown in the display 1414 of FIG. 14 are redisplayed in the display 1514 of the wagering game 1560 shown in FIG. 15. The five "Helmet" symbols 1590 are again aligned on an active payline 1532 that results in the two hundred fifty ('250') credit re-award. The two hundred fifty ('250') credit re-award is re-displayed in the WIN meter 1584 of FIG. 15. Thus, the second triggering event which causes the re-award causes both the re-award of the last award (250 credits) as well as the re-display of the stored outcome which generated that award.

Figure 16:
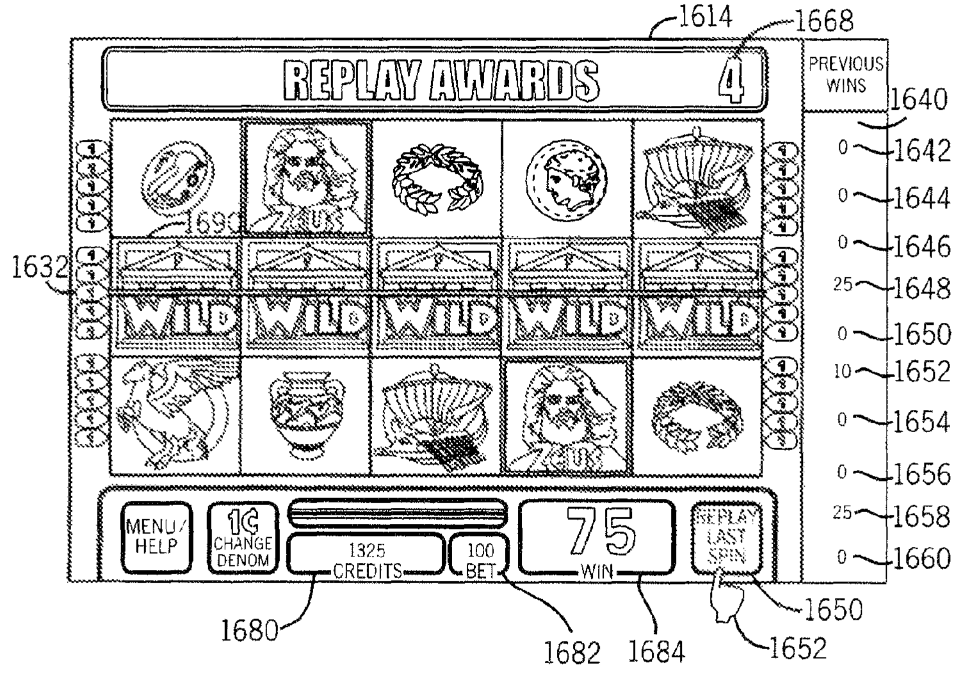
FIG. 16 is a screen shot of a display depicting a player redeeming multiple replay awards.

FIG. 16 illustrates a player redeeming multiple replay awards to "rewind" the game play action several steps in reverse to redeem a stored previous award 1642-1660. The multiple redemptions of FIG. 16 are a continuation of the redemption of a replay award illustrated in FIG. 15. The player redeems two further replay awards beyond the one previously redeemed replay award by pushing the REPLAY LAST SPIN touch screen button 1650 two more times. Because two replay awards are redeemed the number of replay awards displayed in the REPLAY AWARDS meter 1668 is decremented from six ('6') to four ('4'). As before, the redemption of two replay awards results in two more shifts of the prior outcomes displayed in the prior outcomes positions 1542-1560 of FIG. 15. The initial redemption results in a first shift, which is not illustrated.

After the second redemption, the REPLAY AWARDS meter 1668 displays four ('4'), the number of replay awards remaining available for redemption. The second redemption results in a second shift of the prior outcomes field 1640. Thus, the seventy five ('75') credit prior outcome illustrated in the second position 1544 of the prior outcomes field 1540 of FIG. 15 is shifted into the WIN meter 1684 of FIG. 16. Also, the outcome of symbols associated with the seventy five ('75') credit prior outcome is redisplayed in the wagering game 1660 of FIG. 16. Thus, five "WILD" symbols 1690 are aligned on an active payline 1632, comprising the outcome resulting in the stored seventy five ('75') credit award. This results in a re-award of the seventy five ('75') credits displayed in the WIN meter 1684. The CREDITS METER 1680 is updated to reflect the re-award.

In an alternate embodiment, the size of the stored awards group or number of stored outcomes may be larger or smaller than the size of the stored awards group given in the sample embodiments. For example, any number greater or equal to one may be used to comprise the number of awards in the stored awards group. In still another embodiment, an award for winning the stored awards group may be calculated from a subset of stored awards. Rather that totaling all of the awards in the stored awards group, perhaps only the highest award is used. In another embodiment only the last three (out of five) awards are totaled and comprise the re-award.

Alternatively, the re-award may be randomly selected from the stored awards group. In other embodiments, upon the occurrence of a second triggering event (causing a re-award from the prior outcomes field), the prior outcome re-awarded and redisplayed from a group of prior outcomes may be randomly selected from the group of prior outcomes. In yet another embodiment, entries in the stored awards group and prior outcomes group may be removed randomly as new entries are added to the group. Thus the stored awards or prior outcome that has been in the group the longest may not necessarily be removed when a new entry is added to the group. In other embodiments, other eligibility criteria may be employed with regards to stored awards and stored prior outcomes. Such stored awards and outcomes may expire after a certain amount of time has expired. Moreover, other triggering events may remove stored awards and outcomes. For example, certain symbols or combinations of symbols occurring in the wagering game may "kill" or eliminate stored awards and outcomes.

In yet another alternative embodiment, the reels of a display may perform an anticipation spin after one or more bonus symbols appears in a reel. For example, if two ('2') bonus symbols, such as "Lightning" symbols, comprise a triggering event which causes an award of the stored awards group and one ('1') "Lightning" symbol appears on one of the reels, any remaining reels that have yet to stop may perform an anticipation spin wherein the remaining reels are slowed or allowed to spin for a longer amount of time to add anticipation, excitement and/or drama since the player is now aware that only one more "Lightning" symbol will trigger the award. Other eligibility requirements may be utilized as well, for example, the anticipation spin may only occur if a certain wager threshold is met. In another example, the anticipation spin described above may only occur if the total of the awards comprising the stored awards group exceeds a threshold amount, for example, is at least five ('5') times greater than a total bet.

In still another embodiment, a player may have to place an extra bet to win a stored awards group. If the extra bet is not placed, the stored awards group may not be awarded. Alternatively, the number of awards in the stored awards group may vary depending on the size of the extra bet. Thus, a player may play for one or more of the stored awards displayed in the stored awards group. For example, a player may be allowed to play for three ('3') stored awards for seven ('7') credits, while four ('4') stored awards may be in play if the extra bet is for eleven ('11') credits. In a further embodiment, the extra bet may act as a gate that controls whether an award may be stored in the stored awards group. If an extra bet is placed, any award won by a player is placed in the stored awards group. If the extra bet is not placed, a zero ('0') credit award is added to the stored awards group for any award won by a player. In an embodiment, when the stored awards group is awarded, a player would win any awards in the stored awards group regardless of whether an extra bet was placed. In other words, the system may be configured such that an extra bet is required to place awards into the stored awards group, but not required to collect the awards in the stored awards group if and when a triggering event occurs.

In an additional alternative embodiment the size of the extra bet would vary depending on information available concerning the frequency of symbol based wins. The system may track the frequency with which the symbol based triggering event occurs. As an option, the system may include both one or more symbol based triggers as well as one or more mystery triggers causing the awarding of the stored awards group. In one embodiment, the system may use the one or more mystery triggering events to augment or change the frequency which the stored awards group is awarded. For example, if the system monitors the frequency with which the symbol based triggering event occurs and finds this (based upon certain criteria) to be insufficient, the overall frequency of the triggering events may be increased by addition of one or more mystery triggering events to raise the overall frequency of triggering events to a desired level or range.

The frequency of mystery triggered awards may increase or decrease to compensate for the frequency or infrequency of symbol based triggered awards of the stored awards group. Moreover, the symbol based and mystery triggers may be configured so that the frequency with which the stored awards group is awarded is the same for various primary wagering games. For example, a first player may be playing a first primary wagering game which has a lower frequency of symbol based trigger while a second player is playing a second primary wagering game having a higher frequency of a symbol based trigger. A mystery trigger in the first wagering game may be increased such that an overall triggering frequency for the two wagering games (and thus for the two players) is equal.

In still yet another embodiment, a player may be awarded for consecutive wins, or in other words, for going on a "winning streak." The reward may take the form of storing previous awards, enhancing the stored awards and re-awarding the enhanced stored awards for each win that occurs during the winning streak.

Figure 17:
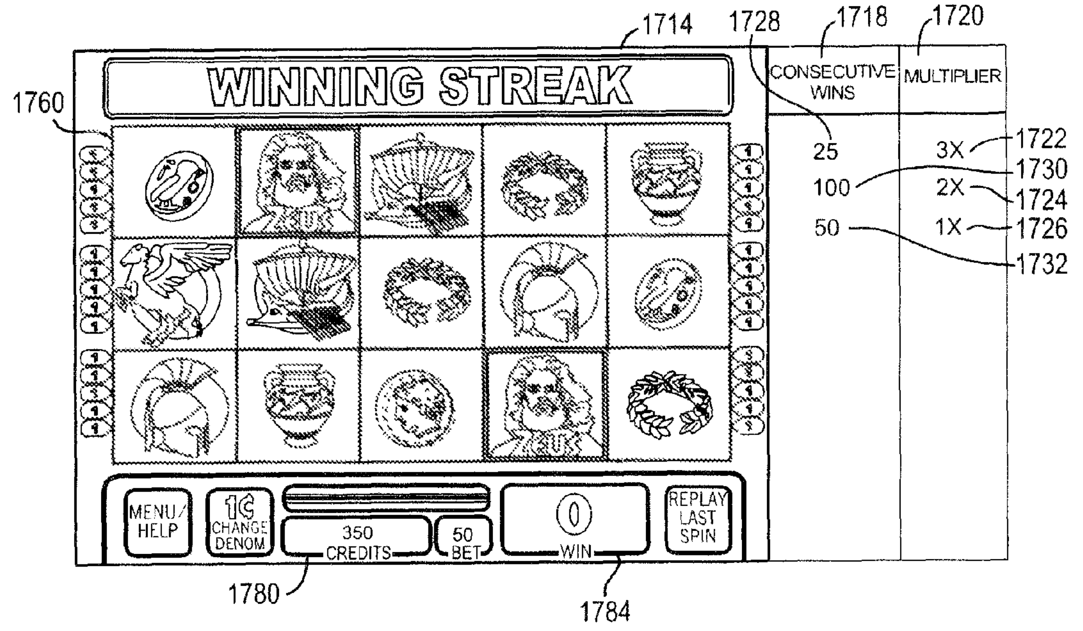
FIG. 17 is a screen shot of a display displaying an alternate embodiment of a wagering game which includes a stored awards group.

Turning to FIG. 17, displayed is a screen shot of a display 1714 that depicts an embodiment of a wagering game 1760 that rewards a player for consecutive wins. In an embodiment, awards are stored in a stored awards group. In the embodiment depicted, a consecutive-wins field 1718 and a multiplier field 1720 represent the stored-awards group. A multiplier or enhancement may be associated with each award displayed in the stored-awards group. The consecutive-wins field 1718 displays awards 1728, 1730, 1732 that were awarded in previous plays. The multiplier field 1720 displays multipliers 1722, 1724, 1726 associated with each of the awards 1728, 1730, 1732 in the consecutive-wins field 1718. For ease of association, an award is displayed just to the left of the multiplier that is associated with the award. In the embodiment depicted, the '3×' multiplier 1722 is associated with the twenty-five credit award 1728. The '2×' multiplier 1724 is associated with the one hundred credit award 1730, and the '1×' multiplier is associated with the fifty credit award.

Each time a player achieves at least one winning combination of symbols in the game 1760 and is awarded an award, the award amount is displayed in the consecutive-wins field 1718. If the consecutive-wins field 1718 is empty, the award amount is displayed at the top of the consecutive-wins field 1718. The next award amount to be displayed in the consecutive-wins field 1718 is displayed beneath the last displayed award. For example, the twenty-five credit award 1728 was awarded first and thus is displayed at the top of the consecutive-wins field 1718. The next awarded award is the one hundred credit award 1730, which is displayed beneath the previously awarded award. The last awarded award, is the fifty credit award, which is displayed last in the consecutive-wins field 1718. Thus, as consecutive wins in the game 1760 yield a series of awards, they may be placed in a queue in the consecutive-wins field 1718.

As a new award is displayed in the consecutive-wins field 1718, a '1×' multiplier is associated with the new award. In one embodiment, the multiplier associated with each award comprising the consecutive-wins field 1718 is incremented by one when a subsequent award is added to the consecutive-wins field 1718. The subsequent (or most recent) award is placed at the bottom of the consecutive-wins field 1718 and associated with a '1×' multiplier.

As shown in FIG. 17, for example, the twenty-five credit award 1728 was awarded first and was associated with a '1×' multiplier when the twenty-five credit award 1728 was added to the consecutive-wins field 1718. The one hundred credit award 1730 was awarded next. When the one hundred credit award 1730 was added to the consecutive-wins field 1718, the multiplier associated with the twenty-five credit award 1728 was incremented by one, to a '2×' multiplier, and the one hundred credit award 1730 was displayed beneath the twenty-five credit award 1728 and associated with a '1×' multiplier. When the fifty credit award 1732 was added to the consecutive-wins field 1718, the fifty credit award 1732 was associated with a '1×' multiplier and the multiplier associated with the one hundred credit award 1730 and the twenty-five credit award 1728 were incremented by one.

Awards continue to be added to the consecutive-wins field 1718 as long as the player continues winning, that is, as long as each consecutive game play results in a non-zero credit award. When a zero credit award is awarded, that is, when a non-winning outcome occurs, the "winning streak" comes to an end and the consecutive-wins field 1718 and the multiplier field 1720 are awarded, and then cleared. In accordance with a feature of this embodiment, when a non-winning result occurs, the player is awarded all the awards stored in the consecutive wins field 1718, as modified by their associated multipliers stored in the multiplier field 1720. Thus, when a non-winning outcome occurs all the credits comprising the consecutive-wins field 1718 are awarded. Awarding all the credits comprising the consecutive-wins field 1718 may entail multiplying each award 1728, 1730, 1732 by its associated multiplier 1722, 1724, 1726. The products are then summed to arrive at an award amount for the entire group of consecutive winning spins.

In the above embodiment, the player does not receive an award immediately following their winning spin, but instead is awarded their award only after a losing spin that follows one or more winning spins. In this embodiment, the disappointment of an inevitable losing spin can be reduced because upon losing, the player is actually credited with the accumulated award amounts from their prior winning streak. Thus, after a winning spin a player is happy because they continue to increase their multipliers on their prior wins and after a losing spin, the player's potential disappointment is somewhat tempered because they are finally awarded the accumulated award amounts from their prior winning streak.

For example, as shown in FIG. 17, game play has concluded and the player failed to achieve a winning combination as evidenced by a zero credit award depicted in the WIN meter 1784. The player is awarded the awards displayed in the consecutive-wins field 1718 with the associated enhancement or multiplier 1722, 1724, 1726 applied to each award 1728, 1730, 1732, respectively. In this example, the award is the sum of the twenty-five credit award 1728 multiplied by the '3×' multiplier 1722, the one hundred credit award 1730 multiplied by the '2×' multiplier 1724, and the fifty credit award 1732 multiplied by the '1×' multiplier 1726. The products are summed which results in a three hundred twenty-five credit award for the winning streak. Although not depicted, the award is then added to the credits displayed in the CREDITS meter 1780. Because game play resulted in a zero credit award (i.e., a non-winning award), the awards displayed in the consecutive-wins field 1718 and multiplier field 1720 will be removed or cleared before a next game play.

Figure 18:
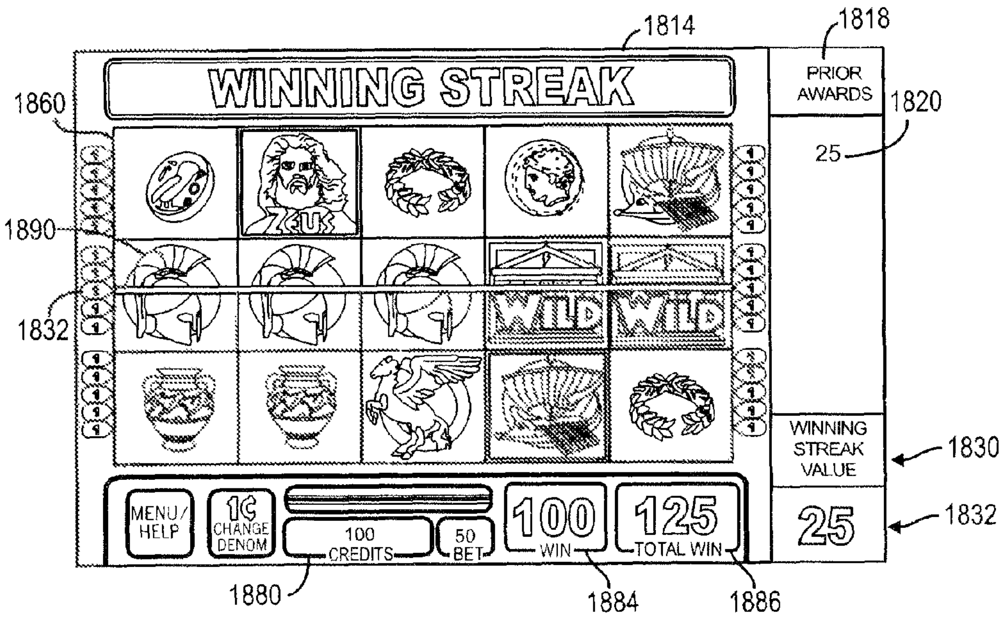
FIG. 18 is screen shot of a display displaying an alternate embodiment of a wagering game which includes a prior-awards field which displays consecutively awarded awards.

In another embodiment, a player is rewarded for going on a "winning streak" by storing prior awards, and re-awarding the stored awards after each consecutive winning spin. Turning now to FIG. 18, displayed is a screen shot of a display 1814 that depicts an embodiment of a wagering game 1860 that re-awards stored awards after each consecutive winning spin. In the embodiment depicted, a portion of the display 1814 displays a stored-awards group that is shown as a prior-awards field 1818. As before, the prior-awards field 1818 displays a history or queue of past awards achieved in playing the game 1860. The prior-awards field 1818 displays awards that may be part of a re-award that is awarded to a player. If there are no awards displayed in the prior-awards field 1818, the most recent award is simply stored and displayed in the prior-awards field 1818. Each subsequent awarded award is displayed beneath the awards already displayed in the prior-awards field 1818.

Displayed at the bottom of the prior-awards field 1818 is a winning-streak-value field 1830. In an embodiment, the winning-streak-value field 1830 displays a value, which is a total of the awards displayed in the prior-awards field 1818. If the player achieves another winning outcome on the subsequent spin to continue the winning streak, the award associated with the subsequent winning outcome is then added to the prior-awards field 1818 and the value in the winning-streak-value field 1830 is updated. This updated value is then provided to the player. The winning streak continues until a player does not achieve at least one winning outcome on a subsequent spin. When the winning streak ends, the values displayed in the prior-awards field 1818 are reset or cleared, the value displayed in the winning-streak-value field 1830 is cleared, the player is not awarded any award for the non-winning spin. Stated in another fashion, with each consecutive win in the "winning streak," the stored awards in the prior-awards field 1818 are re-awarded to the player. Thus, the longer a player achieves consecutive winning outcomes, the more times the awards associated with the prior consecutive winning outcomes will be re-awarded. In this way, the oldest awards are re-awarded the most number of times while the newest awards are re-awarded less.

For example, as depicted in FIG. 18, the twenty-five credit award 1820 displayed in the prior-awards field 1818 was awarded when the prior-awards field 1818 was empty (i.e., the twenty-five credit award 1820 was achieved on a first spin and began the current winning streak). Thus, the twenty-five credit award 1820 is displayed at the top of the prior-awards field 1818. Because the twenty-five credit award 1820 is the only award stored in the prior-awards field 1818, the winning-streak-value field 1830 displays a twenty-five credit value 1832.

As depicted in FIG. 18, a winning combination of three "Helmet" symbols 1890 and two wild symbols aligning on an activated payline 1832 on the player's second spin resulted in a one hundred credit award. The one hundred credit award is displayed in the WIN meter 1884. The player is awarded the value displayed in the TOTAL WIN meter 1886, which is the one hundred credit award plus the value of the award displayed in the winning-streak-value field 1832 (or, in some embodiments, the win meter 1884, total-win meter 1886, and winning-streak-value field 1832 are consolidated into one field or meter). Thus, the player receives a total award of one hundred twenty-five credits for this second spin, which is the one hundred credit award plus a re-award of the twenty-five credit award which was awarded on the previous play. The value displayed in the TOTAL WIN meter 1886 is added to the value displayed in the CREDITS meter 1980.

Figure 19:
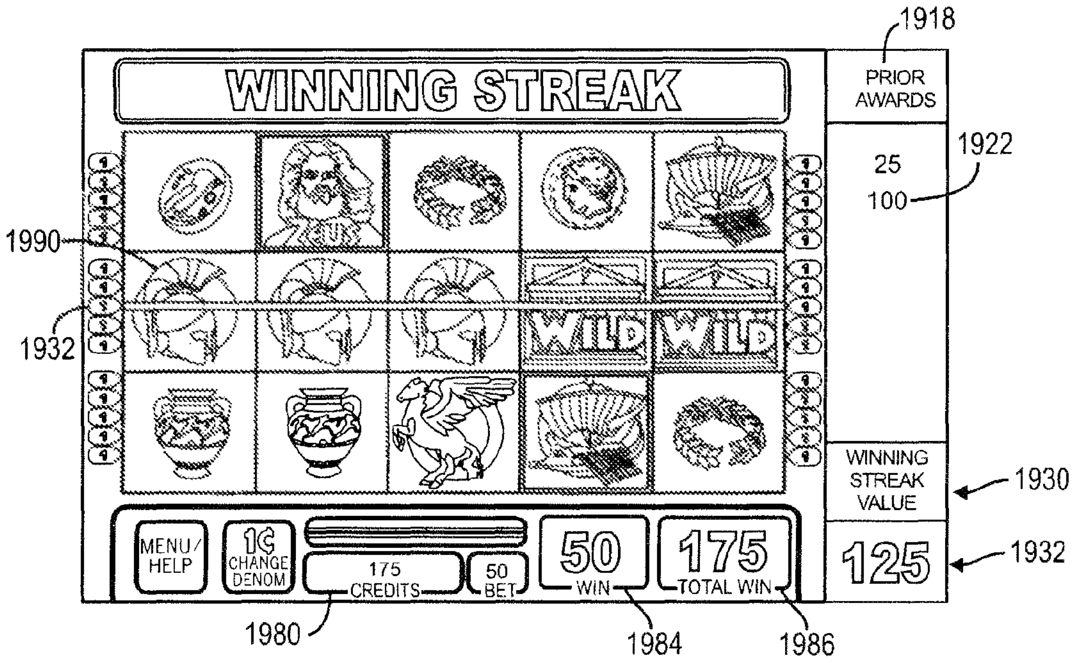
FIG. 19 is a screen shot of a display depicting a further consecutive award stored in the prior-awards field.

FIG. 19 depicts a player being awarded a fifty-credit award as displayed in the WIN meter 1984. The amount available for game play is one hundred seventy-five credits as displayed in the credits meter 1980. A winning combination of three "Helmet" symbols 1990 and two wild symbols aligning on an activated payline 1932 on the player's third spin resulted in a fifty-credit award, which is displayed in the WIN meter 1984. The one hundred credit award 1922 which was achieved by the player on the second spin is now displayed in the prior-awards field 1918. The winning-streak-value field 1930 now displays a one hundred twenty-five credit award 1932, which reflects the addition of the one hundred credit award to the prior-awards-field 1918. Because the player has continued the winning streak, the one hundred twenty-five credit award displayed in the winning-streak-value field is added to the fifty-credit award to arrive at a total award of one hundred seventy-five credits which is displayed in the TOTAL WIN meter 1986. The value displayed in the TOTAL WIN meter 1986 is added to the value displayed in the CREDITS meter 1880.

Figure 20:
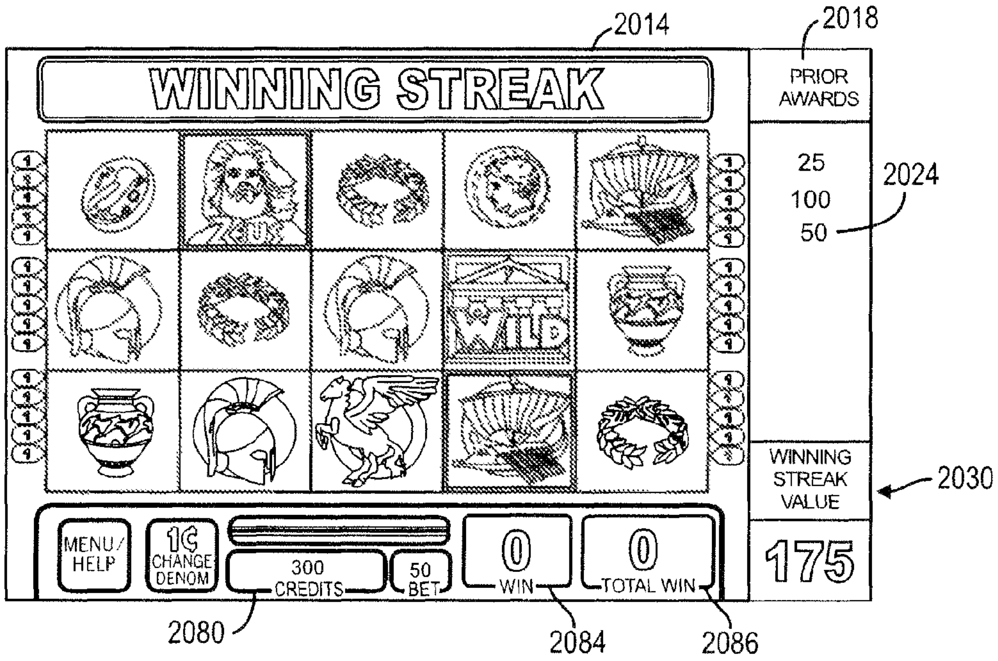
FIG. 20 is a screen shot of a display depicting the award of a zero credit award.

Turning now to FIG. 20, displayed is a screen shot of a display 2014 after a winning-streak has ended. The winning-streak comes to an end when the player fails to achieve a winning outcome on the player's fourth spin (which is indicated with a zero credit award as displayed in the WIN meter 2084). The fifty-credit award 2024 that was awarded in the previous spin is now displayed in the PRIOR AWARDS field 2018. Because the winning streak has ended, the value displayed in the winning-streak-value field 2030 is not awarded. Thus, the total award for this spin is zero as displayed in the TOTAL WIN meter 2086 and accounted in the number of credits displayed in the CREDITS meter 2080. Furthermore, because the winning streak has ended, the prior-awards field 2018 and the winning-streak-value field 2030 will be cleared when the next spin is executed (or prior thereto).

Figure 21:
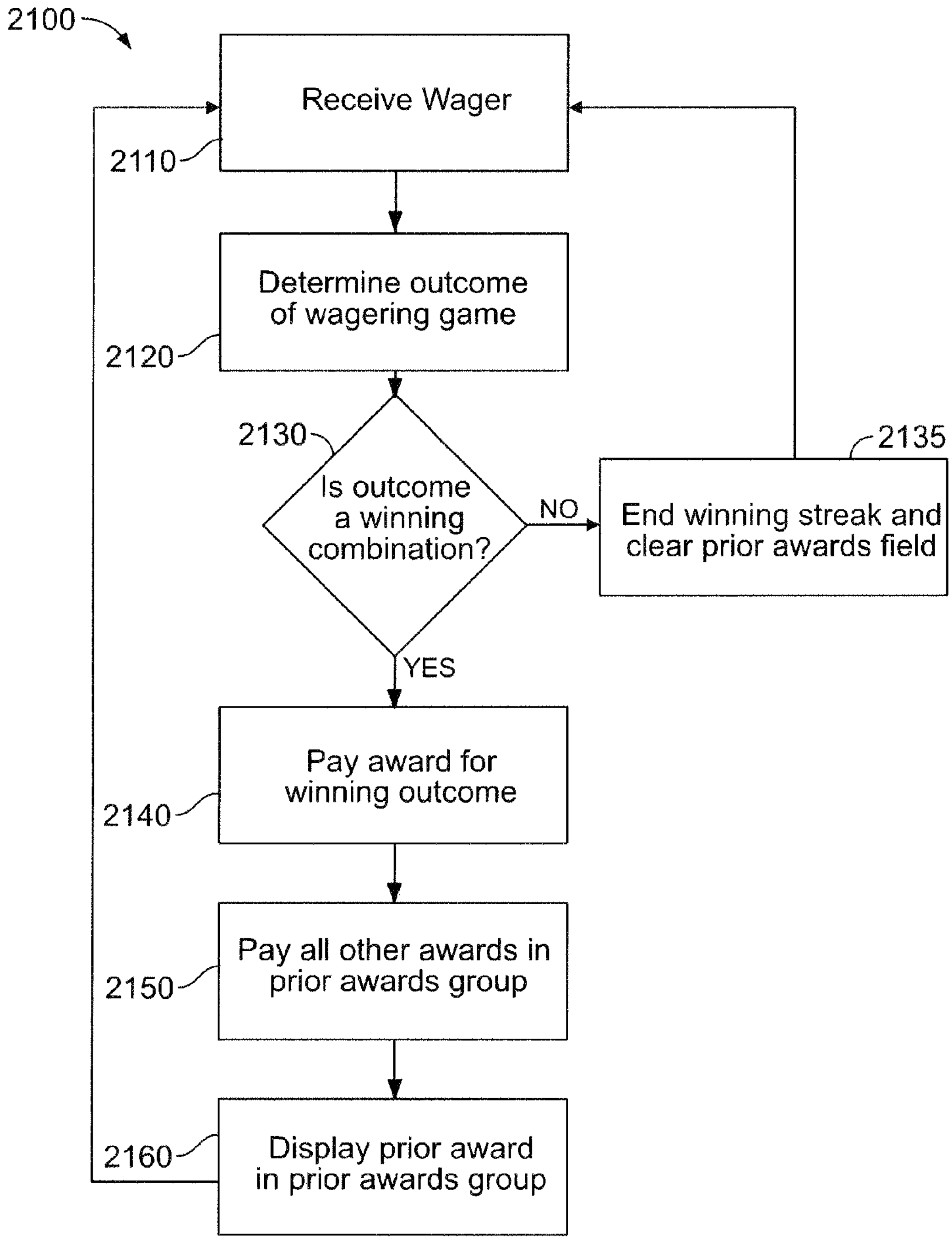
FIG. 21 is flow chart depicting an embodiment of the invention in the form of a method.

Turning now to FIG. 21, shown is a flow chart depicting a method of playing a wagering game according to an embodiment of the disclosure. At step 2110 of the method 2100, a wager is received from a player of the wagering game. At step 2120, in response to the player executing a spin of the wagering game, an outcome of the wagering game is determined and displayed. At step 2130, a determination is made as to whether the outcome is a winning outcome. If the outcome is not a winning outcome, the winning streak is ended at step 2135, the prior-awards field is cleared and the method returns to step 2110 for a subsequent play of the game. If, however, the outcome is a winning outcome, then at step 2140, an award is paid to the player for the winning outcome. Furthermore, at step 2150, all other awards in the prior-awards group are paid to the player (or re-awarded). At step 2160, the most recent award is added and displayed in the prior awards group where it is available to be re-awarded on a subsequent play of the game. The method then returns to step 2110 for a subsequent play of the game. In an embodiment, paying all other awards in the prior awards group 2150 may entail summing the prior awards group and awarding the sum of the prior awards group. In some embodiments, the prior-awards field is summed and the result is displayed in a winning-streak-value field.

In an embodiment, the average return for the "Winning Streak" game may be calculated as:

$$R=B*\mathrm{Lb}/\mathrm{Tb}/(1-P)$$

Where:

R=Average return of the game with the re-award feature;

B=Average return of the base game without the re-award feature;

Lb=Line bet;

Tb=Total bet (this could be the line bet plus an additional extra bet); and

P=Probability of the re-award feature.

As an example, the "Winning Streak" feature may be added to a base game which is a thirty-line game with an average return (or expected value) of eighty-six percent (86%). This signifies that on average, the game will payout $0.86 of awards for every $1.00 of wager received, for example. With an extra bet of ten credits and with a feature probability of one in fifteen and four chances to re-award an award, the return for the base game with the "Winning Streak" feature added would be:

$$0.86*30/40/(1-4/15)$$

which is 0.8795.

Thus the average return for the "Winning Streak" games may be adjusted so as to create a desired overall expected value or payback return. The configuration of a game including such a Winning Streak feature may reduce or eliminate a player's ability to adjust wager sizes and sequences such that a player is unable to increase their expected return through strategic wagering. In some embodiments, a player is prohibited from taking advantage of the order or manner in which awards are stored and re-awarded through eligibility requirements and other rules. In one embodiment, the player may be required to wager on at least the same number of pay lines as a prior win which initiated or continued a Winning Streak. In another embodiment, a requirement for the Winning Streak may be that the player places at least a minimum wager on all pay lines of the wagering game in order to be eligible for the Winning Streak feature. In such configurations strategic wagering in an attempt to increase payback return is not a concern because the expected value for the Winning Streak feature takes into consideration the wager placed on an initial winning outcome which commences the Winning Streak.

For example, one might mistakenly believe that a player could be successful in increasing his return by placing a large wager per pay line until a Winning Streak is commenced, and then reducing his wager to a minimum bet per pay line in an attempt to extend the Winning Streak at the lowest cost to the player. However, such a strategy will not be successful in increasing the player's return over time because of the nature of the feature, as seen in the formulas explained herein. The player's return is in part based upon the initial wager made on the winning outcome commencing the Winning Streak feature. Thus, the average return over time will be based upon the relatively "larger" wager placed on the initial winning outcome at the beginning of the Winning Streak. In other words, by placing larger wagers per pay line in trying to initiate a Winning Streak, the player has funded the expected return, which will be unaffected even if the player subsequently reduces his wager per pay line in furthering the Winning Streak. The expected value is calculated and accounted for based on the initial triggering winning outcome for which the larger wager has been collected. So long as the player's likelihood of winning does not change, his payback return will not change either (i.e. if the player is required to wager on the same number of pay lines on subsequent spins, even if his bet per pay line decreases, the expected return remains the same as that indicated by the formula described herein). In this way, so called "strategic" wagering will be unsuccessful in optimizing the player's return. Thus, in such an embodiment, strategy plays no role and attempts to strategically manipulate outcomes will be unsuccessful given the mathematical configuration employed.

Furthermore, in such embodiments such opportunism is not increased beyond what may already exist for the base game without the re-award feature. One way a player can negatively affect their return is by leaving a "Winning Streak" game that is in an advantageous state (having stored awards). A player can further positively affect their expected return by sitting down to a "Winning Streak" game that is in advantageous state (having stored awards). A first player may leave a game with stored awards remaining and a second player may sit down to the game with the remaining stored awards. However, such a game still holds its overall theoretical or expected value, because the second player's advantage is offset by the first player's disadvantage.

In an alternate embodiment, the prior awards displayed in the prior-awards field 1818 are only awarded when a player loses after a winning streak. For example, a player may achieve awards on three consecutive game plays. If, on the fourth, consecutive game play a player is awarded a zero credit award the winning streak is over. In this embodiment, the award achieved on the first winning spin will by enhanced by a 3× multiplier, while the award achieved on the second winning spin will be enhanced by a 2× multiplier, and the award achieved on the third winning spin (i.e., the final winning spin in the streak) will be awarded without enhancement. Thus, instead of awarding the first winning spin three separate times (once after the first winning spin and then re-awarding after the second and third winning spins) as illustrated in FIGS. 18-21, the player is awarded the total value of the winning streak when the player's winning streak ends (i.e., after the player's fourth spin which did not contain a winning outcome). It should be noted that in this embodiment, the total amount awarded to the player is identical to the value awarded to the player in the embodiment illustrated in FIGS. 18-21.

In some embodiments of the present disclosure, only awards greater than a predetermined threshold (e.g., one hundred credits) are added to the prior-awards field with the potential of being re-awarded to the player. In one embodiment, the award for each spin must be greater than this predetermined threshold in order to begin or continue a winning streak. In another embodiment, any winning outcome can continue a winning streak but only award outcomes in excess of the predetermined threshold will be added to the prior-awards field.

Thus, the re-awarding mechanisms described serve to provide premium or enhanced awards for consecutive wins, or winning streaks. The longer a streak is, the more a player will be awarded as awards continue to be stored in the prior awards group and continue to be enhanced, either by higher multipliers or through the addition function described. In the embodiments described, the triggering event causing the re-awarding of awards stored in the prior awards group comprises the occurrence of a game outcome with no winning combinations of symbols. However, in other embodiments, other triggering events may be used. Additionally, eligibility criteria may be imposed on a player's ability to participate in and receive awards for such a winning streak described.

Turning next to FIGS. 22-28, a gaming system and wagering game, designated generally as 2200, are displayed in accordance with an additional embodiment of the present disclosure. Similar to the embodiments described above, the gaming system 2200 includes a gaming device with a display 2214 configured to display the wagering game 2260, such as is shown by way of example in FIG. 22. In addition, the general arrangement of the gaming system 2200 and the underlying basic-game of the wagering game 2260 may be considered similar to the embodiments presented hereinabove with respect to FIGS. 1A through 21. For instance, the wagering game 2260 may provide a plurality of simulated, movable, symbol bearing reels that are spun, typically in response to a player initiated game play, and stopped to reveal random combinations of symbols. Alternatively, as is shown in FIGS. 22-28, the display 2214 is populated by a plurality of symbol positions, each of which is associated with a corresponding, randomly selected symbol. Winning combinations of symbols landing on activated paylines (those paylines for which a wager has been received), cause awards to be paid in accordance with a paytable of the gaming system.

The wagering game display 2210 may also display a plurality of game-session meters to present information to a player regarding their gaming session. A LINES meter 2280 displays a number of paylines to be played by a player. A TOTAL BET meter 2282 displays the number of credits the player wagered in a particular play of the wagering game 2260. A PAID meter 2284 displays the number of credits a player was awarded for winning combinations occurring on a particular play of the wagering game 2260. By way of example, in FIG. 22, a three-diamond combination aligning left-to-right on an active payline is shown as the outcome of a previous game; the resultant award of four hundred ('400') credits is posted in the PAID meter 2284. Credits won and appearing in the PAID meter 2284 are then transferred to a CREDITS meter 2286, which displays the number of credits the player has available for play of the wagering game 2260, and to a stored awards group, as explained below.

Figure 22:
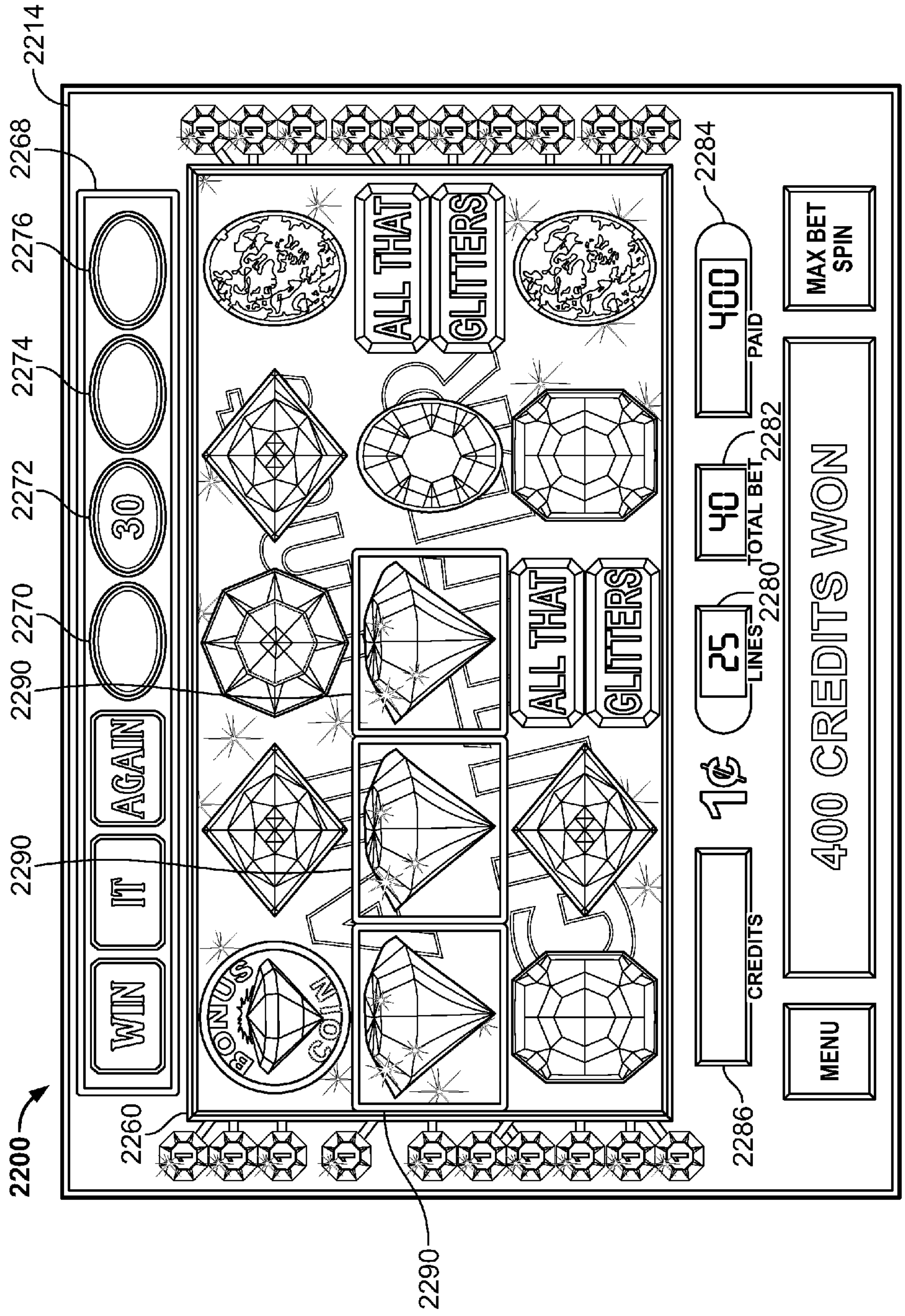
FIG. 22 is a screen shot of a display displaying a wagering game and a group of stored awards in accordance with another alternate embodiment of the present invention.

With continuing reference to the embodiment shown in FIG. 22, a portion of the display 2214 displays a stored awards group 2268. In this embodiment there are four stored award fields, respectively designated as a first stored award field (or "first position") 2270, a second stored award field (or "second position") 2272, a third stored award field (or "third position") 2274, and a fourth stored award field (or "fourth position") 2276. The four stored award fields or positions may be collectively referred to as the stored awards group 2268.

Each stored award field 2270, 2272, 2274, 2276 displays a value of a stored award arranged sequentially from left to right, with the newest stored award in the leftmost award field 2270, and the oldest stored award in the rightmost award field 2276. In this example, each of the stored awards in the group 2268 comprises a number of credits, which are displayed in a respective stored award field. As seen in FIG. 22, for example, the first position 2270 of the stored awards group 2268 is empty, which denotes a zero ('0') credit award, indicating that the most recently completed game just prior to that which is shown in FIG. 22 resulted in no winning combinations of symbols appearing in the wagering game 2260. In this regard, a thirty ('30') credit award has been stored in the second stored award field 2272; accordingly, the wagering game 2260 awarded thirty ('30') credits two-games prior to the game shown in FIG. 22.

In the illustrated embodiment, awards enter the group 2268 and are preferably stored in chronological order, shifting the stored awards group 2268 left to right, and storing the award displayed in the PAID meter 2284 into the first position of the stored award field 2270. That is, upon introduction of a new award, which may include an award of zero ('0'), to the stored awards group 2268, each award is shifted over one stored award field to the right. For further clarification, reference is now made to FIG. 23, which illustrates a screen shot of a display 2314 displaying a wagering game 2360 after completion of a subsequent game play to that illustrated in FIG. 22. The stored award previously displayed in the first position 2270 of the stored awards group 2268 (i.e., an empty field) is now shifted into the second stored award field 2272. Likewise, the stored award formerly shown in the second stored award field 2272 (i.e., the thirty ('30') credit award) is shifted rightward one spot into the third stored award field 2274. Correspondingly, the stored award displayed in the third stored award field 2274 is shifted into the fourth stored award field 2276; and the award previously stored in the fourth stored award field 2276 is removed from the stored awards group 2268. Finally, the stored awards group 2268 has been updated to include the four hundred ('400') credit award from the previous play of the game shown in FIG. 22.

In the embodiment of FIGS. 22-28, the wagering game 2260 provides an opportunity for a re-award of one or more previously awarded awards, such as those stored and displayed in the stored awards group 2268, for winning combinations that result from a "cascading win it again" gaming feature. In other words, the stored awards displayed as prior outcomes or previously awarded awards on the display may be re-awarded in response to a triggering event. The triggering event in this embodiment may be a predetermined number of consecutive winning combinations, each winning combination resulting from a cascading of the symbols displayed in the symbol matrix 2366, as described hereinbelow. Each of the individual winning combinations may provide a separate bonus award in addition to the re-award of previously awarded awards.

Figure 23:
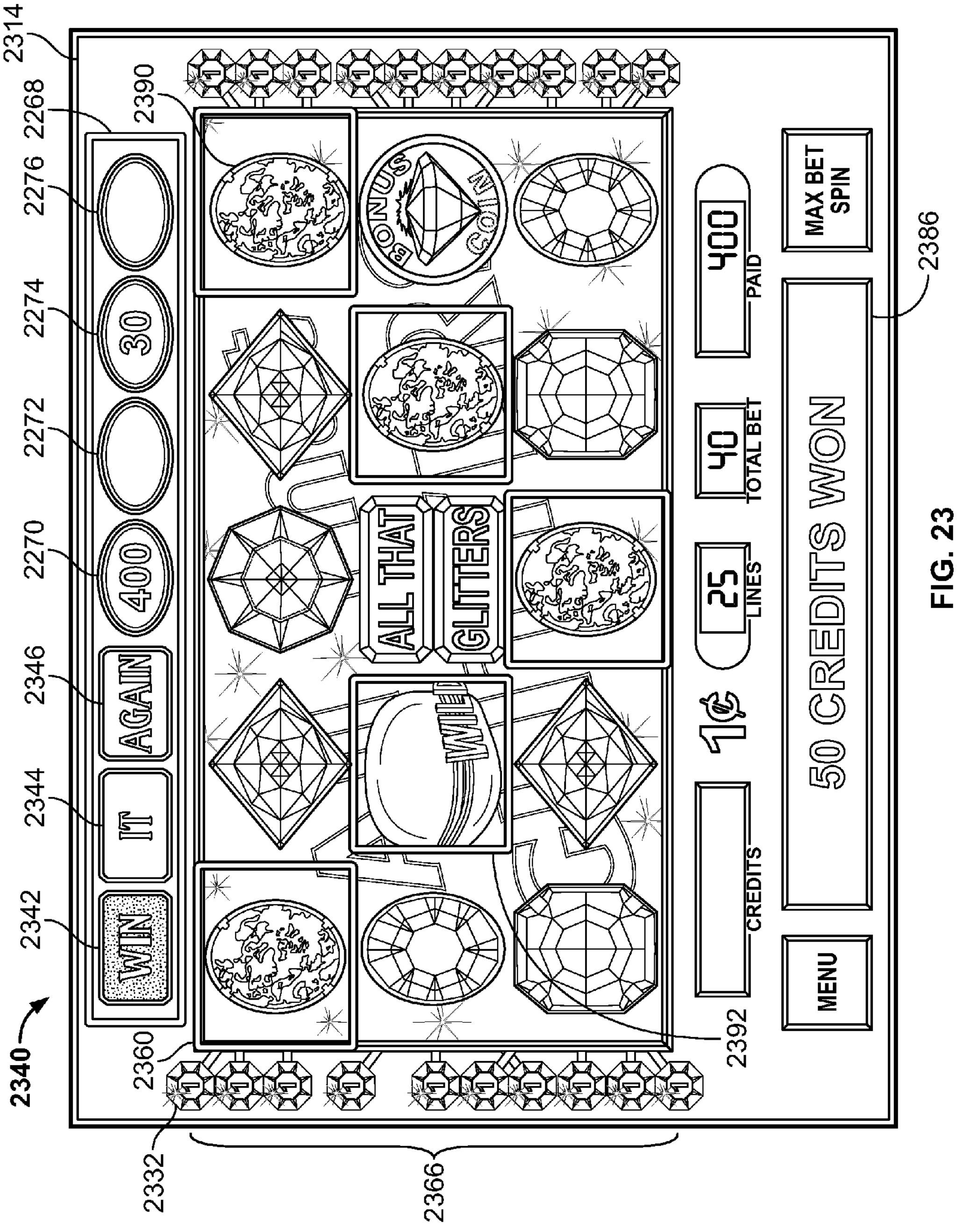
FIG. 23 is screen shot of a display displaying the wagering game and stored awards after storing a four hundred ('400') credit award previously awarded in the wagering game, after an outcome having a winning combination of symbols and an accompanying fifty ('50') credit award, and after highlighting of one of the "win it again" indicators.

The display 2314 of FIG. 23 comprises a field with an array of indicators operable to communicate the commencement of, advancement through, and final outcome of a cascading win it again game. In this exemplary embodiment, the display 2314 exhibits a "WIN IT AGAIN" marquee, designated generally at 2340, with an array of indicators designed to convey a players ascension to higher levels of game play within the win it again game. The array of indicators is represented herein by three boxes: a "WIN" box 2342 (also referred to herein as "first progression indicator"), an "IT" box 2344 (also referred to herein as "second progression indicator"), and an "AGAIN" box 2346 (also referred to herein as "third progression indicator"). As a player ascends from one level to a higher level of play, one or more of the progression indicators—i.e., WIN box 2342, IT box 2344, or AGAIN box 2346, changes at least one characteristic. By way of example, and not limitation, such change in characteristic may include an alteration of the color, shape, size, orientation, highlighting, presence of a marker, or any combination thereof, of the box and/or the contents contained therein. In addition, or as an alternative thereto, the gaming system 2200 may incorporate audio signals and other means for providing a player with information about the win it again gaming feature.

In this embodiment, the win it again feature is enabled by an additional wager from a player of the wagering game 2260. That is, a player of the wagering game 2260 may place an additional wager prior to game play, or prior to reveal of the wagering game outcome, to enable the win it again feature. For example, an extra fifteen ('15') credits may be input for a twenty-five line game to enable the triggering of the win it again feature. In at least some aspects, the additional wager will enable the win it again feature only in combination with a max line bet wager. Alternatively, other aspects of the present concepts do not require the additional wager be placed in combination with a max line bet wager. As seen in the example provided, the TOTAL BET meter 2282 seen in FIG. 22 displays a forty ('40') credit wager in the play of wagering game 2260—twenty-five ('25') credits for the twenty-five line game plus fifteen ('15') credits to enable the win it again feature. Recognizably, enablement of the win it again feature is not limited to this particular example (i.e., an additional wager), but may be enabled by other means (e.g., provided as a randomly-awarded bonus without an additional wager).

FIG. 22 also depicts a triggering event causing initiation of the win it again feature. In the embodiment of FIG. 22, a symbol driven triggering event causes initiation of the win it again feature. The symbol driven triggering event comprises a particular outcome or arrangement of symbols in the wagering game 2260. For example, as seen in FIG. 22, three "Diamond" symbols 2290 appearing simultaneously on a single payline in an outcome of the wagering game 2260 may trigger the win it again feature. It should be appreciated that the symbol driven triggering event is not limited to this particular combination or arrangement of symbols, but may cover any combination or orientation of symbol(s) within the displayed symbol matrix. Moreover, the triggering event may comprise non-symbol driven means, such as time-based triggers where the gaming feature is initiated after a certain amount of playing time has elapsed, or wager-based triggers where the gaming feature is initiated after the total wagers input meets a predetermined amount, etc.

FIG. 23 depicts a first play of the win it again feature, resulting in a fifty ('50') credit award. More particularly, in response to a predetermined triggering event, such as the symbol driven triggering event described above, the gaming system 2200 generates and displays a new set of symbols in the symbol matrix 2366. As illustrated in FIG. 23, the displayed symbols comprise a predetermined winning symbol combination, which may be listed, for example, in a pay table stored in the memory 44 of the terminal 10 or in the external system 46. In this instance, the predetermined winning symbol combination consists of a five-symbol combination, comprising four "Broach" symbols 2390 and one "Wild" symbol 2392 (treated as a "Broach" symbol in the present example) aligning on an active payline 2332. The first win combination displayed in display 2314 results in a fifty ('50') credit award, which is shown in a WIN meter 2386 of FIG. 23. In addition to the fifty ('50') credit award noted above, the first win combination displayed in FIG. 23 triggers advancement to a second, higher game play level in the win it again feature. A player's ascent to the next gaming level is indicated by a first progression indicator, which is represented in FIG. 23 by the WIN box 2342 changing color. If the displayed symbols in FIG. 23 did not comprise a predetermined winning symbol combination, the win it again feature would have ended with no award being presented.

Figure 24:
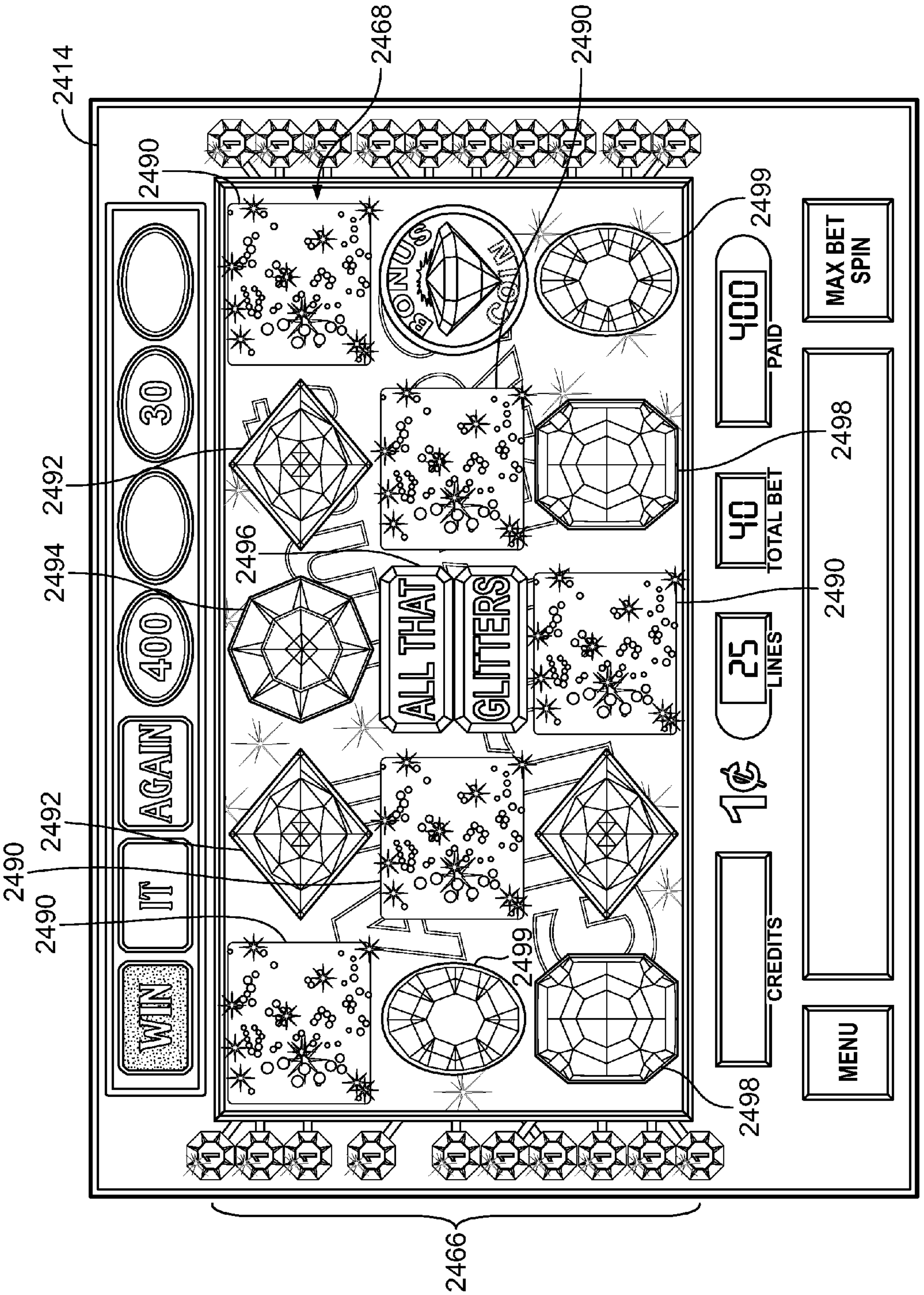
FIG. 24 is a screen shot of a display depicting the wagering game and stored awards during a first cascade of symbols.
Figure 25:
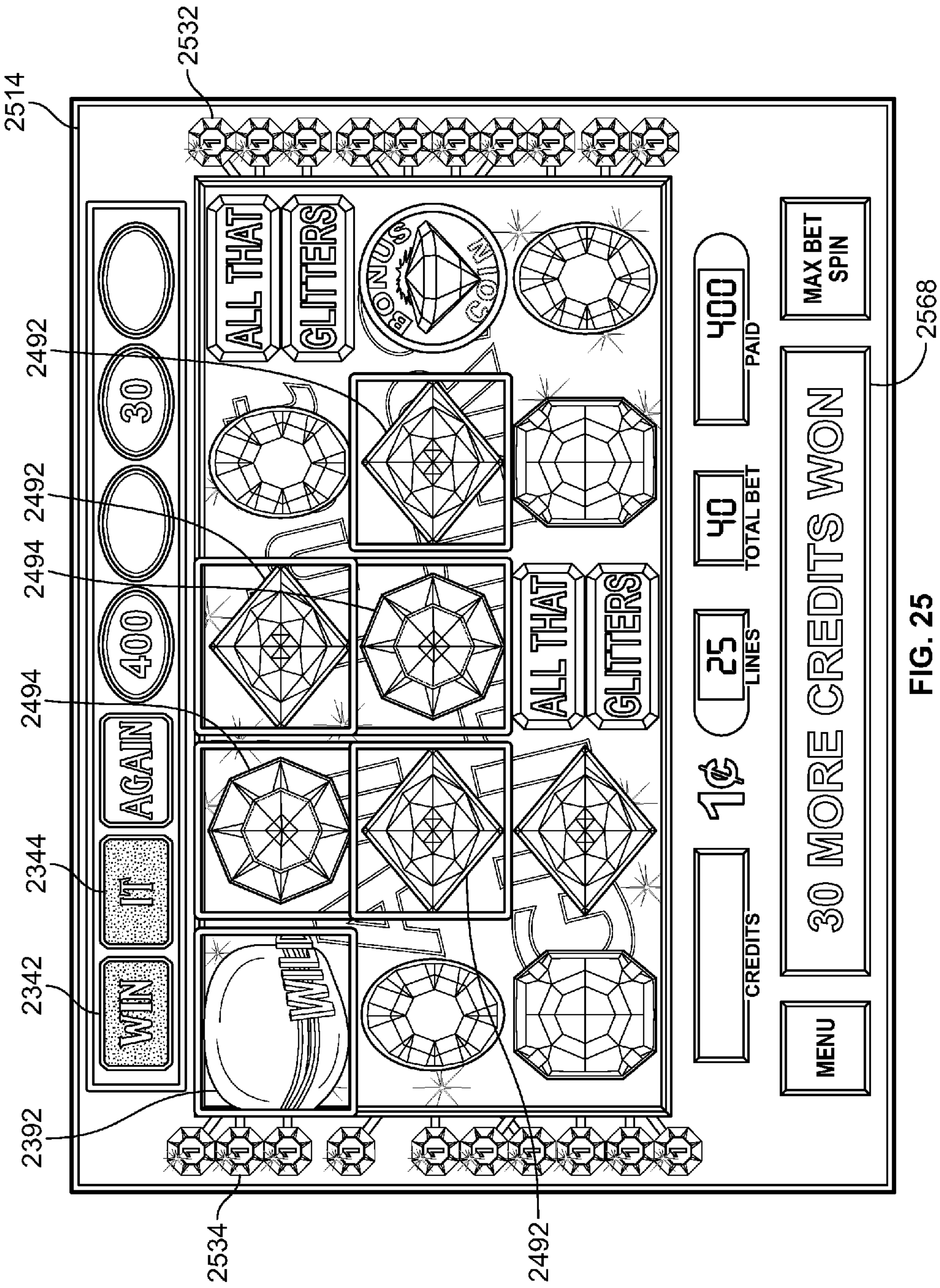
FIG. 25 is a screen shot of a display depicting the wagering game and stored awards after the first cascade of symbols generates a subsequent winning combination, an accompanying thirty ('30') credit award, and the highlighting of a second "win it again" indicator.

Following an occurrence of a winning symbol combination, such as is shown by way of example in FIG. 23, play of the win it again feature progresses, such as is shown in FIGS. 24-25, and the combination of symbols in the symbol matrix 2366 are modified to reveal new combinations of symbols which are evaluated. In this particular embodiment, a plurality of symbol bearing reels are not "spun" to generate new combinations, but rather the existing symbols within the symbol matrix 2366 "cascade" to generate new symbol combinations. As used herein, the term "cascade" is generally intended to indicate the removal of one or more preselected symbols from the existing symbol matrix, and the filling of each vacant position within the matrix with a symbol, such as, but not limited to, a symbol associated with an adjacent symbol position (e.g., a symbol position above the symbol position having the removed symbol).

Looking at the example shown in FIGS. 23 and 24, upon the occurrence of a particular triggering event, such as the first game play within a provided gaming feature resulting in a predetermined winning outcome, the most recent array of symbols are initially locked in position, and the combination of symbols of the first win combination, displayed in associated symbol positions in display 2314 of FIG. 23, are removed. Accordingly, in the example illustrated, the gaming device 2200 removes the winning combination of "Broach" symbols 2390 and "Wild" symbol 2392 displayed in the symbol positions along payline 2332, but leaves all remaining symbols. For ease of explanation, the removal of symbols 2390, 2392 presented in FIG. 23 is illustrated with disappearing animations 2490 in a screen shot of a display 2414 in FIG. 24.

The removed combination of symbols are thereafter replaced by the gaming device 2200. In this particular example, all remaining symbols—i.e., those symbols in the symbol matrix 2466 not previously removed, then shift in a predetermined manner to fill certain newly vacated positions within the symbol matrix. In the exemplary embodiment provided, two "Amethyst" symbols 2492, a "Sapphire" symbol 2494, and the "All that Glitters" symbol 2496 each shift down one position within the symbol matrix 2466 to fill lower positions that are now vacant, as seen in FIG. 25. Contrastingly, those symbols that are already situated in the lowest available position within the symbol matrix 2466, such as the two "Emerald" symbols 2498 and two "Ruby" symbols 2499, remain stationary in the illustrated example, as there is no lower position in the symbol matrix 2466 that is vacant to where they can move. In so doing, the entire first row 2468 of the symbol matrix 2466 is now vacant. In response, the symbol positions in the first row 2468 are then filled with new symbols that are randomly generated by the gaming system 2200.

It should be appreciated that the manner in which the symbol matrix 2366 cascades to generate new symbol combinations is not restricted to the example provided above. For instance, the preselected symbols slated for removal may comprise one or more symbols other than the combination of symbols of the first win combination. Antithetically, the preselected symbols may comprise all symbols other than the combination of symbols of the first win combination. In addition thereto, the preselected symbols may be independent of the win combination, comprising one or more predetermined symbol type (e.g., only "Ruby" symbols, only "broach" symbols, etc.). This may optionally be paired with a lower requirement for winning combos (e.g., 2 instead of 3 or 4). Finally, those symbols remaining after removal of the preselected symbols may be shifted in an alternate manner to that described above (e.g., bottom-to-top, left-to-right, right-to-left) to fill newly vacated positions within the symbol matrix, or need not include shifting at all.

With continued reference to FIG. 25, a screen shot of a display 2514 displays the win it again feature after completion of a second level of game play of the win it again feature illustrated in FIG. 24. In FIG. 25, the displayed symbols comprise two predetermined winning symbol combinations as part of the win it again feature, resulting in a thirty ('30') credit award. As illustrated in FIG. 25, the displayed symbols correspond to two predetermined winning symbol combinations, which, in this instance comprises a four-amethyst combination, including three "Amethyst" symbols 2492 and one "Wild" symbol 2392 that align along an active payline 2532, as well as a two-sapphire combination, including two "Sapphire" symbols 2494 that align along another active payline 2534. The second win combination displayed in display 2514 results in a thirty ('30') credit award, which is shown in a WIN meter 2568 of FIG. 25. If the displayed symbols in FIG. 25 did not comprise a predetermined winning symbol combination, the exemplary play of the win it again feature discussed above would terminate, and the fifty ('50') credit award resulting from the first play of the win it again feature would be paid out. Alternatively, failure of the symbols displayed in FIG. 25 to provide a predetermined winning symbol combination may result in no award being paid out to a player.

In addition to the credit award noted above, the second win combination displayed in FIG. 25 triggers advancement to a third, higher game play level in the win it again feature. A player's ascent to the third gaming level is indicated by a second progression indicator, which is represented in FIG. 25 by the IT box 2344 changing color. Preferably operating in a manner similar to that described above with respect to the example of FIGS. 23 and 24, the array of symbols depicted in FIG. 25 are temporarily locked in position, and the combination of symbols of the second win combination, displayed in associated symbol positions in display 2514 of FIG. 25, are removed and replaced. That is, once the display 2514 is momentarily "frozen", the gaming device 2200 removes the two winning symbol combinations: —i.e., the combination of "Sapphire" symbols 2494 and the combination of "Amethyst" and "Wild" symbols 2492, 2392, respectively displayed in the symbol positions along paylines 2532 and 2534, but leaves all remaining symbols. The removal of symbols 2392, 2492, 2494 is illustrated in a screen shot of a gaming system display 2614 (FIG. 26) with disappearing animations 2690.

Figure 26:
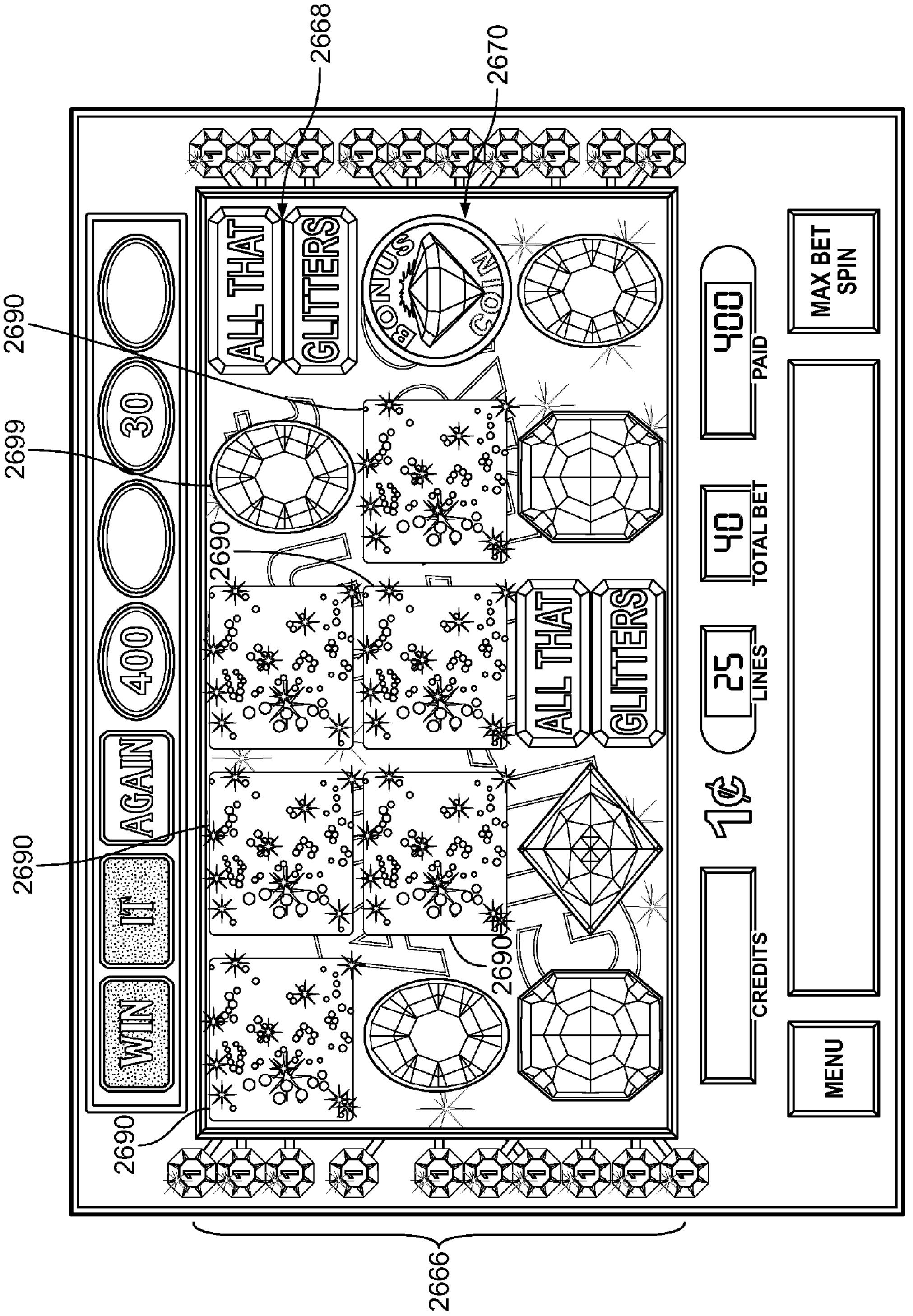
FIG. 26 is a screen shot of a display depicting the wagering game and stored awards during a second cascade of symbols.
Figure 27:
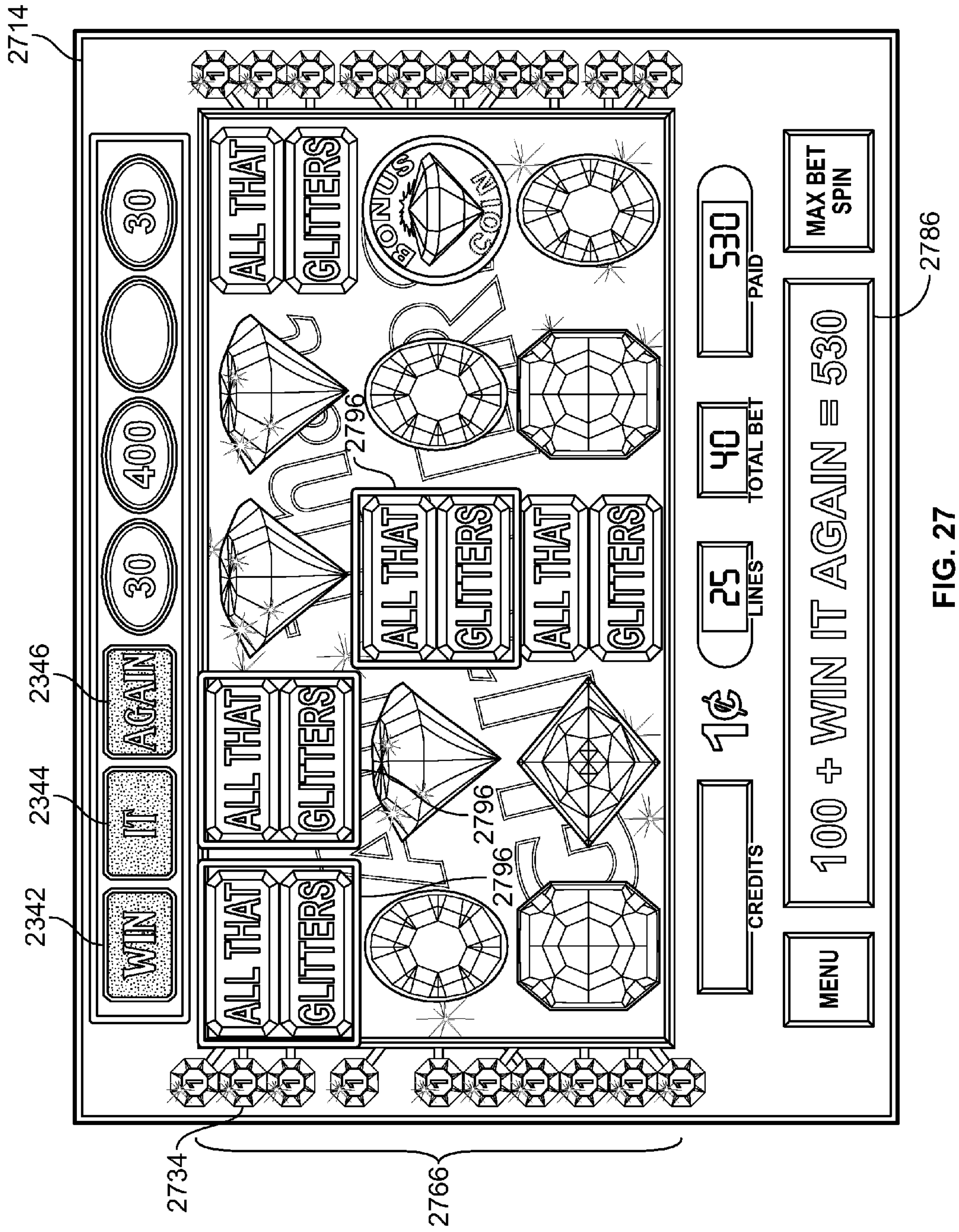
FIG. 27 is a screen shot of a display depicting the wagering game and stored awards after the second cascade of symbols generates yet another winning combination and an accompanying one hundred ('100') credit award, after the highlighting of a third "win it again" indicator, and after a triggering event in response to which a group of stored awards is awarded in addition to the "cascading wins" award.

The removed combination of symbols are thereafter replaced by the gaming device 2200. In this particular example, as shown in FIGS. 25-27, the symbols in the symbol matrix 2666 that were not previously removed are shifted in a predetermined manner to fill the newly vacated positions within the symbol matrix. In FIG. 26, only one symbol, a "Ruby" symbol 2699, shifts down one position within a particular row of the symbol matrix 2666 to fill a lower spot that is now vacant. Contrastingly, all symbols that are already situated in the lowest available position within a particular row of the symbol matrix 2666 remain stationary. In so doing, there are four positions in the first row 2668 of the symbol matrix 2666, and two positions in the second row 2670 of the symbol matrix 2666 that are now vacant (none of which are expressly called out with reference numbers, but are readily apparent from the illustration in FIG. 26). In response, the vacant symbol positions in the first and second matrix rows 2668, 2670 are, following any rearrangement of a displayed symbol from a first symbol position to another symbol position (e.g., the "Ruby" symbol 2699 of FIG. 26), filled with new symbols that are randomly generated by the gaming system 2200.

It should be noted, at this point, the player does not receive an award immediately following either winning outcome in the initial levels of "win it again" game play described above. Instead, a player is awarded an accumulated award only after a losing outcome that follows one or more winning outcomes. Turning to FIG. 27, for example, a screen shot of a display 2714 displays the wagering game 2260 after completion of the third level of game play illustrated in FIG. 26. In this embodiment, the completed game play produces a third winning combination of symbols as part of the win it again feature. The symbols illustrated in FIG. 27 comprise a predetermined winning symbol combination, which, in this instance, comprises a three-symbol combination, including three "All that Glitters" symbols 2796 that align on an active payline 2734. The third win combination displayed in display 2514 results in a twenty ('20') credit award. The third win combination also acts as a triggering event to trigger a "Cascading Win it Again" award. In this example, the bonus "Cascading Win it Again" award comprises all of the previous win it again prizes—e.g., the fifty ('50') credit award resulting from the first game play illustrated in FIG. 23, the thirty ('30') credit award resulting from the second game play illustrated in FIG. 25, and the twenty ('20') credit award resulting from the third game play illustrated in FIG. 27, which are amassed and awarded simultaneously, as indicated by a one hundred ('100') credit award shown in the WIN meter 2786 of FIG. 27. Alternatively, the "Cascading Win it Again" award may consist of a single, preset amount that is awarded in addition to, or in lieu of, all previous win it again prizes. A player's winning of the bonus "Win it Again" award is also indicated by a third progression indicator, which is represented in FIG. 27 by the AGAIN box 2344 changing color.

FIG. 27 also shows a screen shot of a display 2714 illustrating a triggering event causing a re-award of one or more of the awards in the stored awards group 2268 (FIG. 22). In particular, the third consecutive win combination in the win it again feature displayed in FIG. 27 triggers a re-award of all awards stored and displayed in the stored awards group. In the example provided, the re-award award comprises the four hundred ('400') credit award displayed in the first position 2270 of the stored awards group 2268, and the thirty ('30') credit award displayed in the third position 2274 of the stored awards group 2268. The one-hundred ('100') credit "Cascading Win it Again" award and the four-hundred thirty ('430') credit re-award of the stored awards group is indicated by a cumulative five-hundred thirty ('530') credit award shown in the WIN meter 2786 of FIG. 27. A player's winning of the "Cascading Win it Again" award and the re-award of the stored awards group is also indicated, for example, by simultaneous activation of all three progression indicators, which is represented in FIG. 27 by the WIN box 2342, the IT box 2344, and the AGAIN box 2346 all changing colors.

Figure 28:
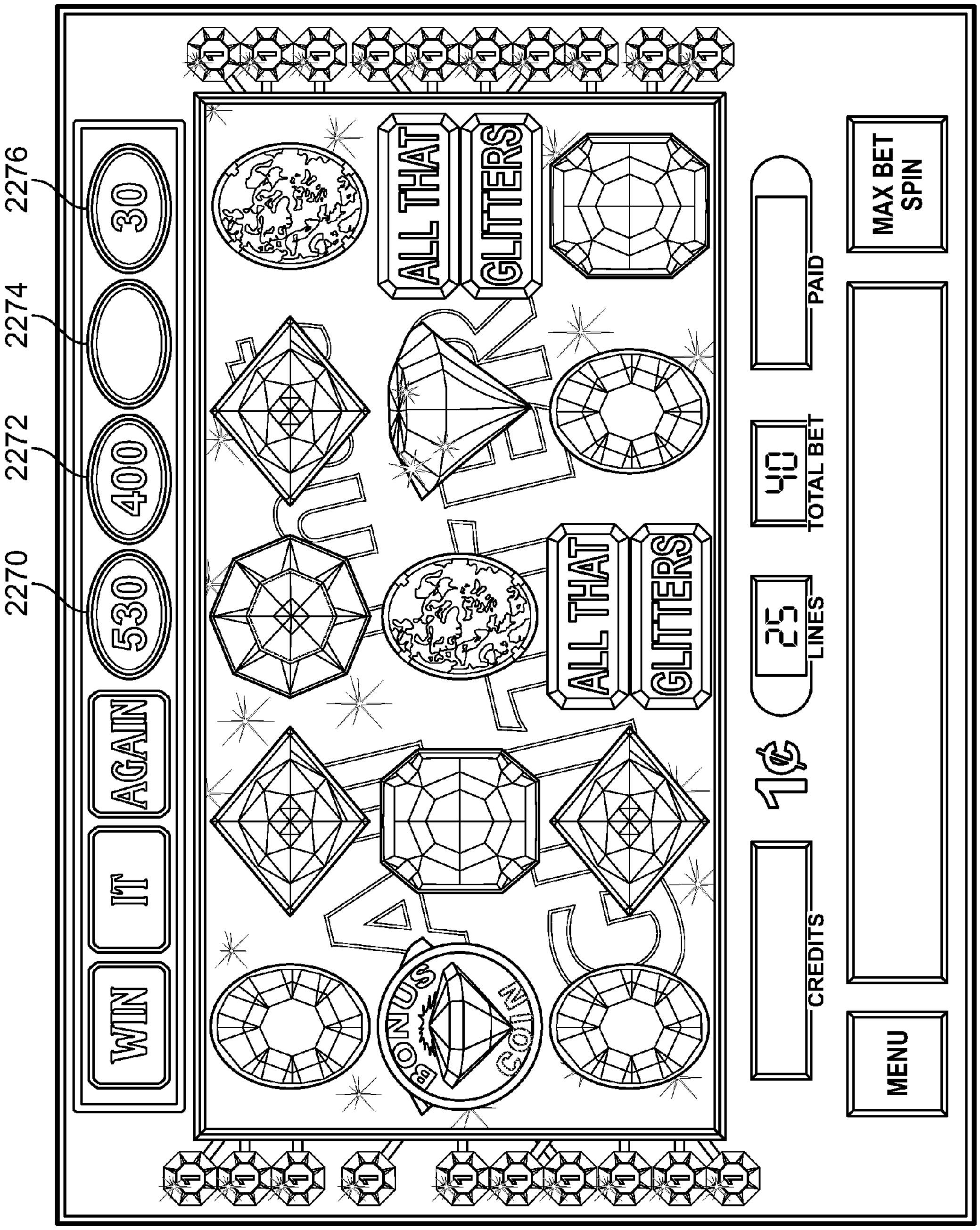
FIG. 28 is a screen shot of a display displaying the wagering game and stored awards after storing yet another award.

The WIN IT AGAIN award—i.e., the combination "Cascading Win it Again" award and re-award of prior stored awards, also counts as an award to be entered into the stored awards group 2268 for successive game play. FIG. 28 illustrates the updated stored awards group 2268, which now reflects the addition of the five-hundred thirty ('530') credit award of FIG. 27 to the first stored awards field 2270 of the stored awards group 2268. Moreover, the other stored awards have been shifted to the right by one award position such that the four hundred ('400') credit award is now in the second stored award field 2272, and the thirty ('30') credit award is now in the fourth stored award field 2276 of the stored awards group 2268.

Additional game play enhancements may be added to the win it again feature to increase player entertainment and excitement associated with game play of the win it again feature. In one example, a multiplier may be associated with a predetermined number of consecutive cascades in a single play. The multiplier, in one aspect, acts to increase the value of any award generated in a game play of the win it again feature. For example, a '2×' multiplier may be awarded to enhance an accumulated award when five cascades occur in a single game play. That is, if a single play of the win it again feature triggers five cascades, any award(s) resulting therefrom will be doubled. In addition or as an alternative thereto, a '5×' multiplier may be associated with eight cascades in a single game play. That is, if a single play of the win it again feature generates eight consecutive cascades, any ensuing award(s) will be quintupled (i.e., multiplied by five). Notably, both the thresholds for triggering such multipliers, as well as the amount of each multiplier may be varied.

Figure 29:
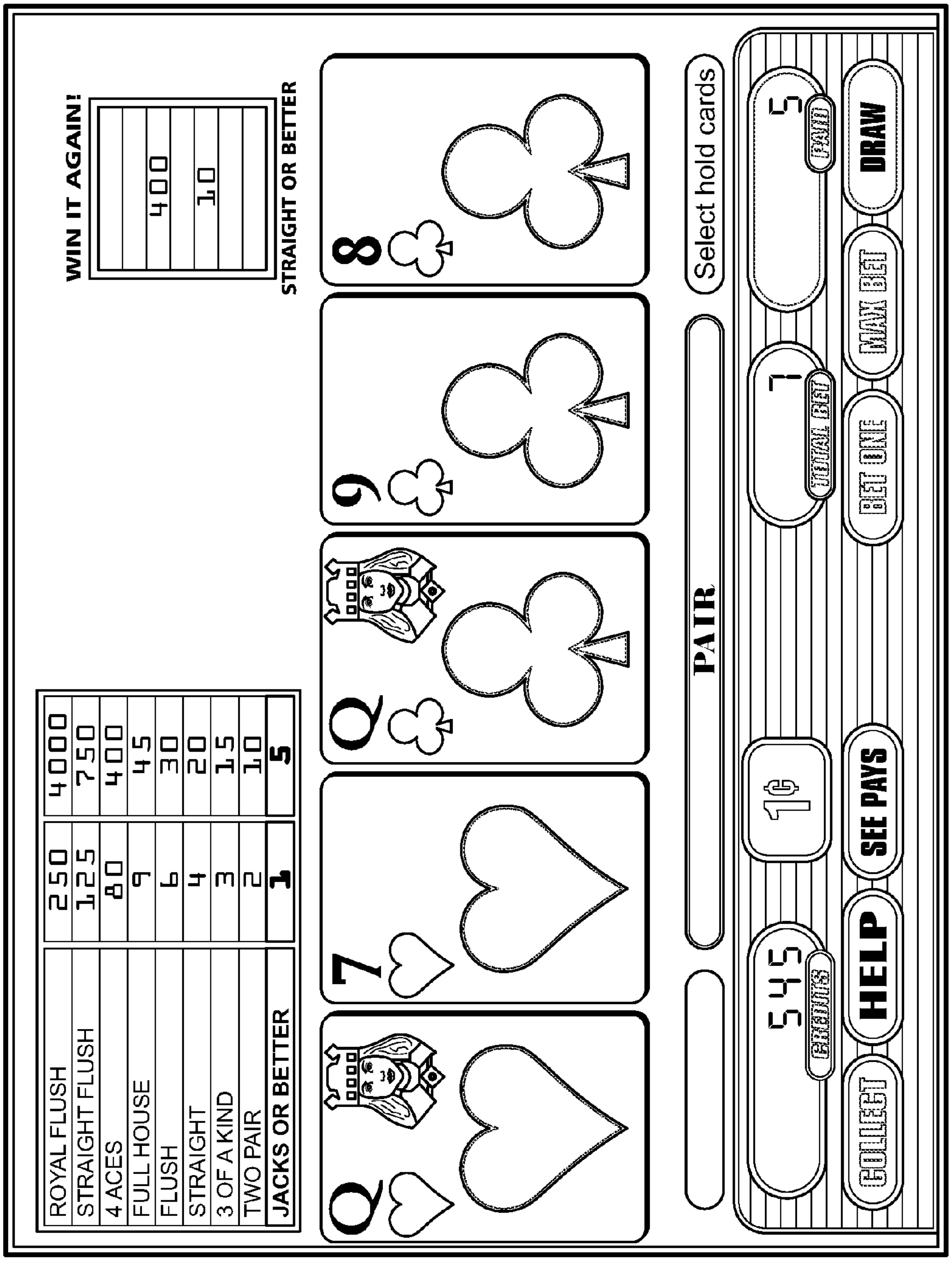
FIG. 29 is a screen shot of a display displaying a wagering game and a group of stored awards in accordance with yet another alternate embodiment of the present invention.
Figure 30:
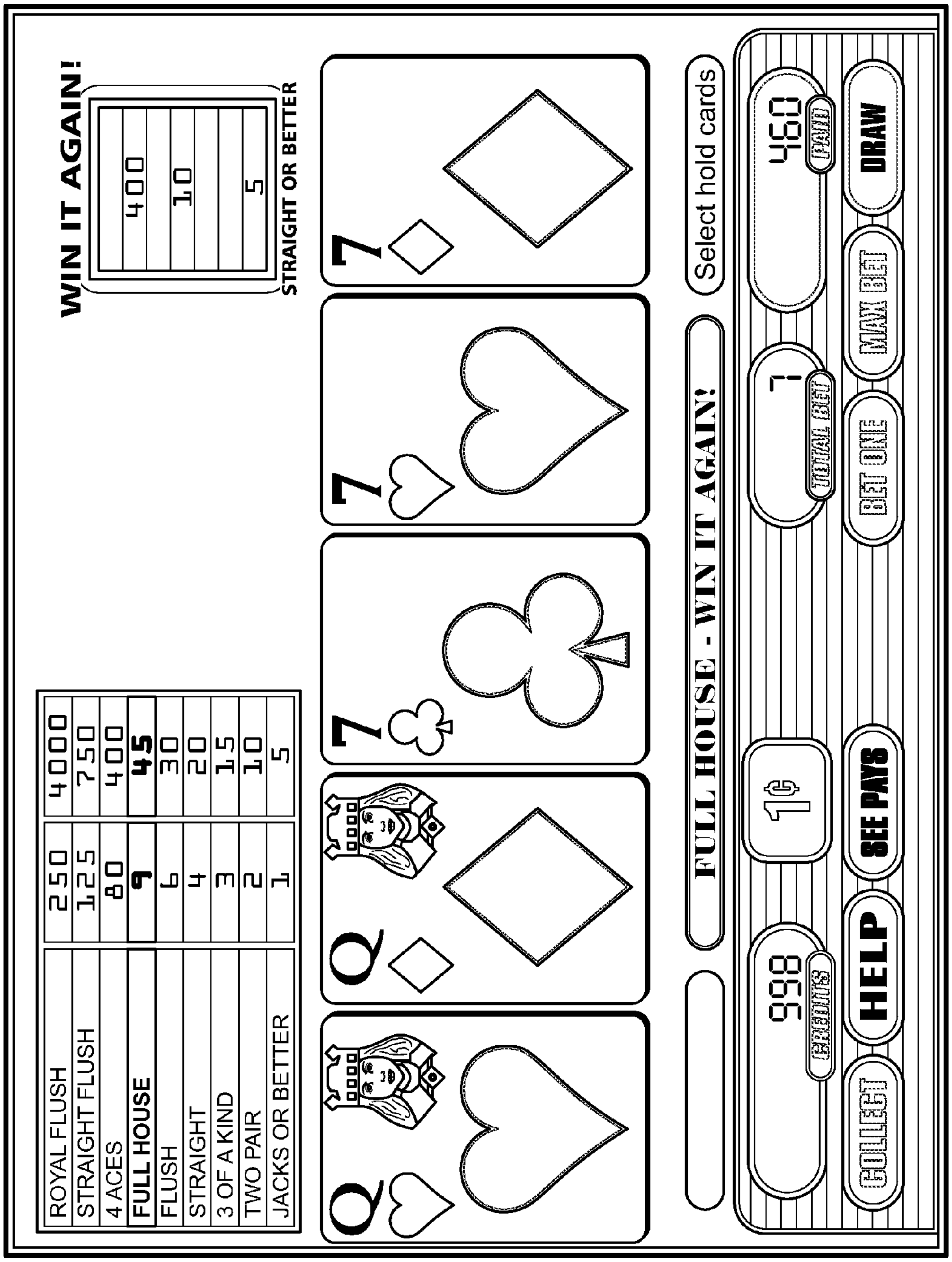
FIG. 30 is a screen shot of a display displaying the wagering game and stored awards after storing a five ('5') credit award previously awarded in the wagering game, after an outcome with a winning draw of cards and an accompanying forty-five ('45') credit award, and after a triggering event in response to which a group of stored awards is awarded.
Figure 31:
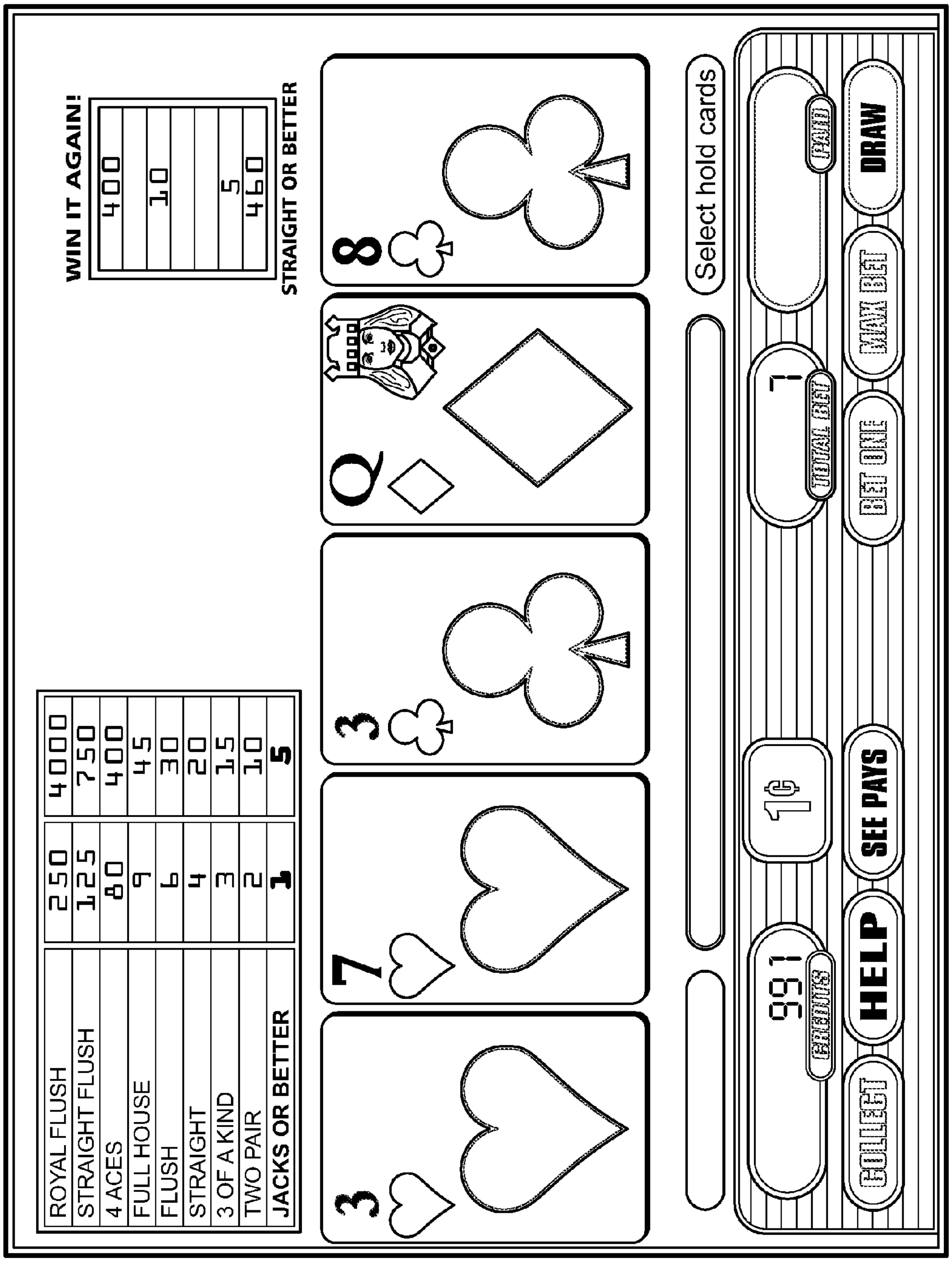
FIG. 31 is a screen shot of a display displaying the wagering game and stored awards after storing yet another award in the stored awards group.

FIGS. 29 through 31 illustrate a wagering game and a group of stored awards in accordance with yet another alternate embodiment of the present invention. In this embodiment, the wagering game is presented as a video poker game, which is exemplified as standard "Five Card Draw" poker. It should be recognized, however, that the wagering game presented in FIGS. 29-31 may comprise other forms of poker, such as "Texas Holdem", "Omaha Hi", "Seven Card Stud", etc., as well as other card games, such as black jack, gin, mah-jongg, baccarat, and known variations thereof, without departing from the scope and spirit of the present invention.

The poker game is preferably played with a single, standard 52-card deck (i.e., Ace through King of four different suits). One or more cards (e.g., sevens, "one-eyed jacks", "suicide kings", etc.) may be designated as "wild". One or more "Joker" cards may be added to the standard deck, each of which may be designated with a predetermined characteristic (e.g., wild). Further, the poker game may be played with additional predefined "special" card(s) for triggering a special feature, as is disclosed, by way of example, in U.S. Pat. No. 7,056,206, to Aoki et al., issued Jun. 6, 2006, and entitled "Method of Conducting a Video Poker Game," which is incorporated herein by reference in its entirety.

FIG. 29 is a screen shot of a display 2914 displaying a wagering game 2960, presenting the poker game of this embodiment prior to a first outcome—e.g., before a new hand is dealt. The image includes five playing cards 2950A-E, certain game-session meters, various buttons selectable by a player, and a pay table, designated generally as 2980 in FIG. 29. In the illustrated embodiment, the game-session meters include, for example, a "CREDITS" meter 2952 for displaying a total number of credits available for play; a "TOTAL BET" meter 2954 for displaying a total number of wagered credits; and a "PAID" meter 2956 for displaying a total number of credits awarded as a result of the most recent play. Other informational fields may be incorporated into the display 2914, such as a hold strategy field 2958, which indicates to a player the presence of a potential winning combination (e.g., the pair of queens illustrated in FIG. 29).

The player-selectable buttons include a "DRAW" button 2960 (also referred to as a "DEAL" button) for causing the game to provide a first outcome—e.g., deal an initial array of cards into a hand. The DRAW button 2960 is also for causing the game to selectively modify the first outcome—e.g., draw cards from a deck to replace any cards in the hand not "held" by a player. A "BET ONE" button 2962 increases the amount of the wager displayed in the TOTAL BET meter 2954 one credit for each press of the button. A "SEE PAYS" button 2964 is provided for accessing extra functions, such as viewing a pay table. A "HELP" button 2966 may be activated, for example, to view instructions on how to play the wagering game. A "COLLECT" button 2968 allows a player to selectively collect any credits remaining on the CREDITS meter 2952 at the end of a game session. A "MAX BET" or "MAX LINE BET" button 2970 is used to wager a maximum number of credits, such as five ('5') credits, without having to repeatedly press the "BET ONE" button 2962. The player-selectable buttons may comprise additional buttons, fewer buttons, and different buttons from those shown. For example, the player-selectable buttons may include a "speed" button for changing the speed at which cards are dealt from the deck (e.g., slow, medium, or fast). In another example, an "easy hold" button may be provided such that when a wining hand is dealt, a player may hold all the winning cards in the dealt hand, prior to the draw, with a single press of the "easy hold" button.

A pay table 2980 is preferably positioned above the playing cards 2950A-E. The pay table 2980 displays a general list of successful outcomes (e.g., winning poker hand rankings), indicated generally as 2982, and the corresponding number of credits awarded for each outcome, designated generally in FIG. 29 at 2984. The winning poker hand rankings are presented, in order from highest to lowest, as: a Royal Flush, a Straight Flush, Four of a Kind, a Full House, a Flush, a Straight, Three of a Kind, Two Pair, and a Pair of Jacks or Better. Any poker hand having a ranking less than a Pair of Jacks or Better is deemed a "losing hand", and thus does not have an award associated therewith. In the illustration provided, the number of credits won is linearly proportional to the number of credits wagered, except that a "royal flush" yields a bonus when achieved on a maximum wager. To this regard, in the illustrated example the previous outcome comprised a queen of hearts, a seven of hearts, a queen of clubs, a nine of clubs, and an eight of clubs. This hand has one of the winning rankings 2982 listed in the pay table 2980, namely a pair of queens, which has a corresponding award of five ('5') credits, as indicated in the PAID meter 2956.

Similar to the embodiments described above with respect to FIGS. 4-28, the display 2914 of FIG. 29 also displays a stored awards group 2940 that displays at least one previously awarded award. In the embodiment depicted in FIG. 29, there are seven prior awards each displayed in a respective one of seven stored award fields, respectively designated as 2942-2948. The stored awards fields 2942-2948 show awards from seven preceding plays of the wagering game 2960, with the most recently stored award located at the bottom of the stored awards group 2940 in the first field 2942, and the oldest stored award positioned at the top of the stored awards group 2940 in the seventh field 2942. The stored awards group 2940 may contain a heading or caption, labeled in the example provided as "WIN IT AGAIN!" in FIG. 29.

In the present example, each of the stored awards in the group 2940 comprises a number of credits, which are displayed in a respective stored award field. As seen in FIG. 29, for example, the first, second, fourth, sixth and seventh stored awards fields 2942, 2943, 4945, 2947 and 2948, respectively, of the stored awards group 2240 are empty, which denotes a zero ('0') credit award for each field. In this regard, a ten ('10') credit award has been stored in the third stored award field 2944, and a four-hundred ('400') credit award has been stored in the fifth stored award field 2946. Accordingly, the ten ('10') credit award was awarded to a player in a more recent game play of the wagering game 2960 than the four-hundred ('400') credit award.

In accordance with certain aspects of the present concepts, the introduction of a newly awarded award into the stored awards group 2940 may be initiated by a predetermined triggering event. A player of the wagering game 2960 may place an additional wager prior to game play, or prior to reveal of the wagering game outcome, to have a previously awarded award stored in the stored awards group 2940. For example, an extra two ('2') credit wager (or "side bet") may be input on a max line bet play (e.g., five ('5') credits) to have any award awarded for that play of the wagering game, such as the five ('5') credit award presented in the PAID meter 2956 of FIG. 29, stored and displayed in the stored awards group 2940, as seen by way of example in FIG. 30. Alternatively, other aspects of the present concepts do not require the additional wager be placed in combination with a max line bet wager. Clearly, other triggering events, such as a card or card-combination based triggering event, may be employed to initiate introduction of a newly awarded award into the stored awards group 2940. In contrast, as described above with respect to FIGS. 22 and 23, each newly awarded award may be automatically added to the stored awards group 2940 without requiring the occurrence of a predetermined triggering event during wagering game play. For example, the input of the extra wager itself causes any award for the corresponding play of the wagering game to be automatically added to the stored awards group 2940.

In the illustrated embodiment, awards enter the group 2940 and are preferably stored in chronological order, shifting the stored awards group 2940 bottom-to-top upon introduction of a newly stored award. That is, upon introduction of a new award, which may include an award of zero ('0'), to the stored awards group 2940, each award is shifted up one stored award field. By way of clarification, comparative reference is now made to FIGS. 29 and 30, FIG. 30 illustrating a screen shot of a display 3014 displaying a wagering game 3060 after completion of a subsequent game play to that illustrated in FIG. 29. The stored award previously displayed in the first stored award field 2942 of FIG. 29 (i.e., an empty field) is now shifted into the second stored award field 2943 in FIG. 30. Likewise, the stored award formerly shown in the second stored award field 2943 of FIG. 29 is shifted upward one spot into the third stored award field 2944 of FIG. 30; the stored award displayed in the third stored award field 2944 (i.e., the ten ('10') credit award) has been shifted into the fourth stored award field 2945; the stored award previously displayed in the fourth stored award field 2945 is shifted into the fifth stored award field 2946; the stored award previously displayed in the fifth stored award field 2946 (i.e., the four-hundred ('10') credit award) is shifted into the sixth stored award field 2947; and the stored award previously displayed in the sixth stored award field 2947 is shifted into the seventh stored award field 2948. Finally, the award previously stored and displayed in the seventh stored award field 2948 in FIG. 29 is removed from the stored awards group 2940 shown in FIG. 30, and the stored awards group 2940 of FIG. 30 is updated to include the five ('5') credit award from the previous play of the game shown in FIG. 29.

The wagering game 2960 of FIGS. 29-31 provides a player with an opportunity to win one or more previously awarded awards, such as those stored and displayed in the stored awards group 2940 of FIG. 30. The stored awards displayed as previously awarded awards in the display 2914 may be re-awarded in response to a predetermined triggering event. The triggering event in the embodiment illustrated in FIGS. 29-31 may be a minimum winning outcome, such as a winning poker hand ranking of a straight or higher. The win it again feature may alternatively be enabled by any other preselected event, randomly generated outcome, or input.

Referring now to FIG. 30, shown is a screen shot of a display 3014 illustrating a triggering event causing a re-award of one or more of the awards in the stored awards group 2940. The display 3014 displays the wagering game 3060 after completion of a new game play. After a player makes an initial wager, such as the seven ('7') credit wager in the TOTAL BET meter 2954 illustrated in FIG. 29, and presses the DRAW button 2960, five cards are dealt from a standard 52-card deck. Thereafter, the player is allowed, but not required, to select and discard a predetermined number of unwanted cards—e.g., via touching each card the player wishes to keep, and pressing the DRAW button 2960 a second time to remove and replace the remaining cards. The discarded cards are replaced with substitute cards from the deck, resulting in a final card hand, which may comprise, for example, the five cards 3050A-E.

In the illustrated embodiment of FIG. 30, the final outcome of the game play resulted in a full house, where the first and second cards 3050A, 3050B are both queens, and the third, fourth and fifth cards 3050C, 3050D, 3050E are 7's. The wagering game 2960 determines a poker hand ranking of the final card hand, a "full house" in this instance, and provides an award based on the pay table 2980. In the example of FIG. 30, the player initially wagered the maximum available bet, e.g., five ('5') credits, so the player is awarded a forty-five ('45') credit award for the full house draw. In addition, because the winning outcome exceeds the predetermined trigger threshold for the win it again feature, defined as a winning poker hand ranking of a straight or higher in the examples shown in FIGS. 29-31, one or more of the awards in the stored awards group 2940 is provided again to the player—i.e., "re-awarded". As seen in FIG. 30, the awards displayed in the stored awards group 2940 comprise awards of 5, 0, 0, 10, 0, 400 and 0 credits, respectively oriented in the seven stored award fields 2942-2948, and totaling four-hundred fifteen ('415') credits. Thus, the re-award, which in this example is four-hundred fifteen ('415') credits, is provided to the player in addition to the forty-five ('45') credit award for the full house, shown collectively as the four-hundred sixty ('460') credit award in the PAID meter 2956 of FIG. 30.

Turning to FIG. 31, the stored awards group 2940 has been updated to include the re-award from FIG. 30. FIG. 31 is a screen shot of a display 3114 illustrating the updated stored awards group 2940, which now reflects the addition of the four-hundred sixty ('460') credit award of FIG. 30 to the first stored awards field 2942 of the stored awards group 2940. Thus, the re-award amount may be won again if a subsequent triggering event occurs so long as the re-award is stored and displayed in the stored awards group 2940. The remaining awards have once again been shifted one position up to accommodate the addition of the re-award amount.

All of the embodiments presented herein are susceptible to various permutations within the inventive scope of the claimed subject matter. In a first example, the number of stored awards fields displayed in a stored awards group may be increased (and optionally decreased) upon the occurrence of a certain predetermined triggering event, increasing (or decreasing) the potential value of the re-award award. For example, in either a slot game or card game embodiment, the appearance of a predetermined triggering symbol may temporarily increase the number of stored award fields for one or more subsequent plays of the wagering game. Thus, the stored awards group may, for example, cause awards that had been previously shifted upwardly from the seventh stored award field 2948 of FIG. 29 to reappear in an expanded stored awards group (e.g., having 8, 9, 10 or a greater number of stored award fields). It is to be noted that the number of stored award fields retained in the system memory 44 may exceed the number of stored award fields displayed on display 14.

In a second example, the payout of stored awards in the win it again feature may be provided on a tiered basis. For instance, the wagering game may be configured such that a winning poker hand ranking of a straight or better will award a player the award(s) presented in a first plurality of stored award fields. In addition, a winning poker hand ranking of a full house or better will award a player the award(s) presented in a second plurality of stored award fields greater in number than the first plurality of stored award fields. Moreover, a winning poker hand ranking of a straight flush or better will award a player the awards presented in a third plurality of stored award fields, the third plurality of stored award fields being greater in number than the first or the second plurality of stored award fields.

While the best modes for carrying out the present invention have been described in detail, those familiar with the art to which this invention relates will recognize various alternative designs and embodiments for practicing the invention within the scope of the appended claims. Each of the above embodiments and obvious variations thereof is contemplated as falling within the spirit and scope of the claimed invention, which is set forth in the following claims. For example, the updating of the stored awards groups may occur contemporaneously with the awarding of an award or may occur at some point prior to initiation of a subsequent play of the wagering game or immediately thereafter.

What is claimed is:

1. A gaming system for playing a wagering game, the gaming system comprising:

one or more processors; and one or more memory devices storing instructions that, when executed by at least one of the one or more processors, cause the gaming system to:

receive, via at least one input device, an indication of a wager from a player to play the wagering game;

display, via at least one display device, a randomly determined first outcome of the wagering game;

responsive to the first outcome including one of a plurality of potential winning combinations:

(i) store and display, via the at least one display device, a first award associated with the first outcome in a stored awards group;

(ii) display, via the at least one display device, another randomly determined outcome of the wagering game; and (iii) responsive to the another outcome including one of the potential winning combinations, store and display another award associated with the another outcome in the stored awards group and return to step (ii), or (iv) responsive to the another outcome not including one of the potential winning combinations, award to the player a cumulative award comprising the awards stored in the stored awards group, wherein each award stored and displayed in the stored awards group is associated with a respective award enhancement displayed via the at least one display device and, each time another award is stored and displayed in the stored awards group, the displayed award enhancement associated with the previously stored awards are increased.

2. The gaming system of claim 1, wherein the stored awards group is continuously displayed via the at least one display device during successive plays of the wagering game.

3. The gaming system of claim 1, wherein the one or more memory devices store additional instructions that cause the gaming system to, responsive to the another outcome not including one of the potential winning combinations and the awarding of the cumulative award, clear all awards stored and displayed in the stored awards group.

4. The gaming system of claim 1, wherein, each time another award is stored and displayed in the stored awards group, the award enhancements associated with the previously stored awards are increased incrementally.

5. The gaming system of claim 1, wherein the award enhancements are award multipliers and, each time another award is stored and displayed in the stored awards group, the award multipliers associated with the previously stored awards are increased incrementally.

6. The gaming system of claim 5, wherein the cumulative award comprises the mathematical sum of the awards stored in the stored awards group after each of the awards is multiplied by its respective award multiplier.

7. The gaming system of claim 1, wherein the award enhancements are continuously displayed via the at least one display device during successive plays of the wagering game in a multiplier field.

8. The gaming system of claim 1, wherein the stored awards group is configured such that, when the first award is added to the stored awards group, the first award is displayed in a first position of the stored awards group.

9. The gaming system of claim 8, wherein the stored awards group is further configured such that, each time one of the another awards is added to the stored awards group, any award displayed in the first position are shifted to a second position of the stored awards group, and the another award is displayed in the first position of the stored awards group.

10. The gaming system of claim 1, wherein each occurrence of (ii) includes receiving another wager, in addition to the first wager, to display another randomly determined outcome of the wagering game.

11. The gaming system of claim 1, wherein the wagering game includes a plurality of symbol-bearing reels, each of the reels having a plurality of reel positions populated by a plurality of symbols.

12. The gaming system of claim 1, wherein the stored awards group is limited to storing a maximum total number of previously awarded awards.

13. The gaming system of claim 12, wherein a predetermined triggering event increases or decreases the maximum total number of previously awarded awards that can be stored in the stored awards group.

14. The gaming system of claim 1, wherein the one or more memory devices store additional instructions that cause the gaming system to display a winning-streak-value field which includes a value of the sum of all awards stored and displayed in the stored awards group.

15. The gaming system of claim 1, wherein the one or more memory devices store additional instructions that cause the gaming system to award to the player the first award and each of the another awards, if any, at least once prior to awarding the cumulative award.

16. The gaming system of claim 1, wherein all awards stored and displayed in the stored awards group after the first award result from a corresponding consecutive winning play of the wagering game that is part of a winning streak.

17. One or more non-transitory machine-readable storage media including instructions which, when executed by one or more processors, cause the one or more processors to perform operations comprising:

receiving an indication of a wager to play the wagering game;

directing at least one display device to display a randomly determined first outcome of the wagering game;

responsive to the first outcome including one of a plurality of potential winning combinations:

(i) directing the at least one display device to display a first award associated with the first outcome in a stored awards group;

(ii) directing the at least one display device to display another randomly determined outcome of the wagering game; and (iii) responsive to the another outcome including one of the potential winning combinations, directing the at least one display device to display another award associated with the another outcome in the stored awards group and returning to step (ii), or (iv) responsive to the another outcome not including one of the potential winning combinations, awarding to the player a cumulative award comprising the sum of the awards stored in the stored awards group, wherein each award stored and displayed in the stored awards group is associated with a respective award enhancement displayed via the at least one display device and, each time another award is stored and displayed in the stored awards group, the displayed award enhancement associated with the previously stored awards are increased.

18. A method of conducting a wagering game on a gaming system, the method comprising:

receiving an indication of a wager to play the wagering game;

directing at least one display device of the gaming system to display a randomly determined first outcome of the wagering game;

responsive to the first outcome including one of a plurality of potential winning combinations:

(i) directing the at least one display device to display a first award associated with the first outcome in a stored awards group;

(ii) directing the at least one display device to display another randomly determined outcome of the wagering game; and (iii) responsive to the another outcome including one of the potential winning combinations, directing the at least one display device to display another award associated with the another outcome in the stored awards group and returning to step (ii), or (iv) responsive to the another outcome not including one of the potential winning combinations, awarding to the player a cumulative award comprising the sum if the awards stored in the stored awards group, wherein each award stored and displayed in the stored awards group is associated with a respective award enhancement displayed via the at least one display device and, each time another award is stored and displayed in the stored awards group, the displayed award enhancement associated with the previously stored awards are increased.

19. The method of claim 18, wherein the stored awards group is continuously displayed via the at least one display device during successive plays of the wagering game.

20. The method of claim 18, wherein the awards in the stored awards group are stored and displayed in sequential order.

21. The method of claim 18, further comprising, responsive to the another outcome not including one of the potential winning combinations and the awarding of the cumulative award, clearing all awards stored and displayed in the stored awards group.

22. The method of claim 18, wherein the award enhancements are award multipliers and, each time another award is stored and displayed in the stored awards group, the award multipliers associated with the previously stored awards are increased incrementally, and wherein the cumulative award comprises the mathematical sum of the awards stored in the stored awards group after each of the awards is multiplied by its respective award multiplier.

23. The method of claim 18, wherein the stored awards group is configured such that, when the first award is added to the stored awards group, the first award is displayed in a first position of the stored awards group and, each time one of the another awards is added to the stored awards group, any award displayed in the first position are shifted to a second position of the stored awards group, and the another award is displayed in the first position of the stored awards group.

24. The method of claim 18, wherein the award enhancements are continuously displayed via the at least one display device during successive plays of the wagering game in a multiplier field.

25. The method of claim 18, wherein, each time another award is stored and displayed in the stored awards group, the award enhancements associated with the previously stored awards are increased incrementally.

26. A method of conducting a wagering game on a gaming system with at least one input device and at least one display device, the method comprising:

a) receiving, via the at least one input device, at least one wager to play the wagering game;

b) displaying, via the at least one display device, a first outcome of the wagering game, the first outcome including at least one winning outcome, the at least one winning outcome being associated with a first award;

c) displaying, via the at least one display device, the first award in a stored-awards group;

d) displaying, via the at least one display device, another outcome of the wagering game;

e) in response to the another outcome of the wagering game not including at least one winning outcome, awarding the awards displayed in the stored awards group and clearing all awards displayed in the stored-awards group; and f) in response to the another outcome of the wagering game including at least one winning outcome associated with another award value:

(i) enhancing all awards displayed in the stored-awards group;

(ii) displaying the another award value in the stored-awards group; and (iii) repeating at least steps (d) through (f).

27. One or more non-transitory machine-readable storage media including instructions which, when executed by one or more processors, cause the one or more processors to perform operations comprising:

a) receiving, via an input device, at least one wager to play the wagering game;

b) displaying, via at least one display device, a first outcome of the wagering game, the first outcome including at least one winning outcome, the at least one winning outcome being associated with a first award;

c) displaying, via the at least one display device, the first award in a stored-awards group;

d) displaying, via the at least one display device, another outcome of the wagering game;

e) in response to the another outcome of the wagering game not including at least one winning outcome, awarding the awards displayed in the stored awards group and clearing all awards displayed in the stored-awards group; and f) in response to the another outcome of the wagering game including at least one winning outcome associated with another award value:

(i) enhancing all awards displayed in the stored-awards group;

(ii) displaying the another award value in the stored-awards group; and (iii) repeating at least steps (d) through (f).

* * * * *